US012415294B2

(12) United States Patent
Ye et al.

(10) Patent No.: US 12,415,294 B2
(45) Date of Patent: Sep. 16, 2025

(54) DISTRIBUTION DEVICE AND MANUFACTURING METHOD FOR FULL-BODY TEXTURED PORCELAIN STONEWARE SLAB

(71) Applicants: NEWPEARL (GUANGDONG) NEW MATERIAL CO., LTD, Guangdong (CN); NEW PEARL GROUP CO., LTD., Guangdong (CN); FOSHAN SANSHUI GUANZHU CERAMIC CO., LTD, Guangdong (CN)

(72) Inventors: Delin Ye, Guangdong (CN); Runtong Jian, Guangdong (CN); Zhangwu Chen, Guangdong (CN); Likuo Qin, Guangdong (CN); Aiwu Luo, Guangdong (CN); Dingbang Xian, Guangdong (CN)

(73) Assignees: NEWPEARL (GUANGDONG) NEW MATERIAL CO., LTD, Zhaoqing (CN); NEW PEARL GROUP CO., LTD., Foshan (CN); FOSHAN SANSHUI GUANZHU CERAMIC CO., LTD, Foshan (CN)

( * ) Notice: Subject to any disclaimer, the term of this patent is extended or adjusted under 35 U.S.C. 154(b) by 154 days.

(21) Appl. No.: 18/154,820

(22) Filed: Jan. 14, 2023

(65) Prior Publication Data

US 2023/0211522 A1 Jul. 6, 2023

Related U.S. Application Data

(63) Continuation of application No. PCT/CN2020/133064, filed on Dec. 1, 2020.

(30) Foreign Application Priority Data

Jul. 14, 2020 (CN) ........................ 202010675594.1

(51) Int. Cl.
*B28B 13/02* (2006.01)
*B28B 17/00* (2006.01)

(52) U.S. Cl.
CPC ........ *B28B 13/023* (2013.01); *B28B 17/0081* (2013.01)

(58) Field of Classification Search
CPC .............. B28B 13/023; B28B 17/0081; B28B 13/0245; B28B 13/022; B28B 13/027; B28B 3/02; B28B 11/001; B28B 11/243
See application file for complete search history.

(56) References Cited

U.S. PATENT DOCUMENTS 1,557,935 A * 10/1925 Henroz ................. B28B 13/022 425/134
5,662,847 A * 9/1997 Uchida ................. B29C 43/006 264/122

FOREIGN PATENT DOCUMENTS

CN 101214696 A * 7/2008 ........... B28B 13/022
CN 101549522 A 10/2009
(Continued)

OTHER PUBLICATIONS

International Search Report of PCT Patent Application No. PCT/CN2020/133064 issued on Apr. 16, 2021.

*Primary Examiner* — Donnell A Long

(57) ABSTRACT

Disclosed is a distribution device and a manufacturing method for a full-body textured porcelain stoneware slab and relates to the field of construction ceramic tile production. The distribution device includes a feeding assembly, a powder-preforming box, and a belt conveying assembly, where the powder-preforming box is arranged at an included angle α with a conveying plane of the belt conveying assembly, and 61°≤α≤90°, and an intersecting line of a lower end of the powder-preforming box and the conveying plane of the belt conveying assembly is at an included angle (Continued)

β with a center line of the conveying plane of the belt conveying assembly, and 45°≤β≤90°. A process using the distribution device can produce a full-body textured porcelain stoneware slab of a natural flowing effect, and can form a straight or diagonal textured pattern effect as needed.

6 Claims, 12 Drawing Sheets

(56) References Cited

FOREIGN PATENT DOCUMENTS

| | | | | | |
|---|---|---|---|---|---|
| CN | 101913195 | A | | 12/2010 | |
| CN | 102126249 | A | | 7/2011 | |
| CN | 102225577 | A | * | 10/2011 | |
| CN | 103817785 | A | | 5/2014 | |
| CN | 204819903 | U | | 12/2015 | |
| CN | 108214850 | A | | 6/2018 | |
| WO | WO-0172489 | A2 | * | 10/2001 | ........... B05B 7/1495 |

* cited by examiner

DISTRIBUTION DEVICE AND MANUFACTURING METHOD FOR FULL-BODY TEXTURED PORCELAIN STONEWARE SLAB

CROSS REFERENCE TO RELATED APPLICATIONS

The present application is a Continuation Application of PCT Application No. PCT/CN2020/133064 filed on Dec. 1, 2020, which claims the benefit of Chinese Patent Application No. 202010675594.1 filed on Jul. 14, 2020. All the above are hereby incorporated by reference in their entirety.

TECHNICAL FIELD

The present disclosure relates to the field of construction ceramic tile production, and specifically to a distribution device and a manufacturing method for a full-body textured porcelain stoneware slab.

BACKGROUND

In modern construction decoration, natural stones undoubtedly have advantages in color and surface texture due to their natural characteristics, but with the continuous exploitation, natural mineral resources are becoming increasingly scarce. Ceramic products with superior physical and chemical properties are becoming more and more popular, and there is a growing demand especially for stones with a full-body pattern effect or a natural smooth sandstone texture-like surface effect.

Porcelain slabs with natural smooth texture trends are mainly sandstone-imitated porcelain slabs, such as ceramic tiles with inkjet-printed patterns. Although many sandstone surface patterns are imitated, these imitated patterns are essentially merely surface effects, rather than full-body patterns. In addition, an inkjet process for such imitated surface patterns adopts a glaze or a dry granular material as a surface protective layer, and in order to ensure the presentation of a prominent inkjet effect, these materials need to be highly transparent after being sintered and thus are based on a glass phase. It is well known in the industry that the wear resistance of a glazed surface is not as high as the wear resistance of a surface of a green body based on clay sands.

There are also ceramic products with striped textures fabricated by other distributing techniques.

For example, Chinese patent No. CN102225577A discloses a line pattern effect obtained through repeated superposition of a ceramic powder in an aggregate box, where the aggregate box is arranged at an inclination angle of 15° to 60°, and a pattern distributing hopper and a line distributing hopper above the aggregate box have different feed amounts along the entire distributing width, such that a cross section of the aggregate box receives different amounts of the ceramic powder at different positions and the ceramic powder accumulates with high and low heights alternately to form a texture. In the above process, a texture is formed through shoving and accumulation, and when the aggregate box is arranged in such an inclination angle, the ceramic powder will not flow under its gravity on a slope. In addition, a product fabricated by the aggregate box requires two-time distribution and even a fine powder without fluidity. The above process cannot achieve a fluid texture and a full-body pattern textured effect, which can hardly meet the needs of consumers who expect these porcelain slabs to achieve a full-body effect with consistent pattern textures from outside to inside.

Chinese patent No. CN102126249A discloses a dense fine line pattern effect formed by a process in which a micro-powder in a distributing hopper and hoppers in front and rear lines is allowed to fall onto a powder guide strip connected to a longitudinal material-receiving belt in a longitudinal material-receiving cavity, is repeatedly superimposed, and then is allowed to fall onto a plane conveyor belt through the rotation of the longitudinal material-receiving belt. In the above process, a ceramic raw material is used in the form of a micro-powder without fluidity, and because well exhaust is not allowed during press stamping when all micro-powder are distributed one time, it is well known in the industry that, in the industrial mass production, it is unfeasible to fabricate a dry-pressed full-body fine powder ceramic product through only micro-powder distributing, and the ceramic product can only be fabricated through two-time distributing, which cannot lead to a full-body effect. In addition, due to the thickness limitation of the micro-powder during pressing, a distance between the longitudinal material-receiving belt in the longitudinal material-receiving cavity and a glass plate, namely a width of the powder guide strip, is small, and the micro-powder is horizontally superimposed on the powder guide strip and thus has no fluidity. Moreover, the micro-powder on the powder guide strip is flipped by nearly 90° under a conformal action of an arc corner at a bottom of the glass plate to fall onto the plane conveyor belt, where a conformal effect is achieved due to the non-fluidity of the micro-powder. Although this distributing process can lead to a horizontal texture pattern, a product fabricated from the micro-powder does not have a sandstone-like fluid texture with fluidity for a powder mainly with a particle size of 60 to 100 mesh, and also does not have a full-body effect. Therefore, this distributing process cannot meet the paving needs of consumers for cutting, edging, and chamfering.

Chinese patent No. CN101913195A discloses a sandstone-like slab with a transverse texture, where through distribution at a plurality of work stations and the push of a plurality of heteromorphic pusher grilles, a powder is pushed and extruded by the heteromorphic pusher grilles to form a texture layout, and material filling and sweeping are finally conducted to form a whole texture zone. In the above technical solution, due to the push and extrusion of the heteromorphic pusher grilles, fixed modeling traces are formed, and artificial traces are obvious, such that it is difficult to imitate a natural effect of sandstone in nature formed due to the melt and flow of magma. In addition, in the above distributing process, a blank space vacated after the push and extrusion of the last heteromorphic pusher grille needs to be filled with the material and then swept, such that a texture zone of a product of the above technical solution is not a full-body effect from a bottom to a surface, and the full-body green body texture effect cannot be realized to meet the paving needs of consumers for cutting, edging, and chamfering. Most importantly, the above process does not adopt a layout in which various powders of different colors are allowed to flow on a slope surface in a designed sequence to form a powder texture.

In summary, the existing technical solutions all need to be further improved, and the achievement of a controllable straight or diagonal layout as in natural stone and production of a natural smooth full-body textured pattern is a technical problem to be solved urgently.

SUMMARY

In order to solve the above technical problems, a first objective of the present disclosure is to provide a distribution device for a full-body textured porcelain stoneware slab, including a feeding assembly, a powder-preforming box, and a belt conveying assembly. The powder-preforming box is arranged at an included angle of 61° to 90° with a conveying plane of the belt conveying assembly, such that a ceramic raw material in the powder-preforming box can rely on its own weight to accumulate and flow in a preforming cavity, thereby forming a fluid-like layout. The use of the distribution device can produce a full-body textured porcelain stoneware slab of a natural flowing effect, and can form a straight or diagonal textured pattern effect as needed.

To achieve the first objective of the present disclosure, the present disclosure adopts the following technical solutions:

A distribution device for a full-body textured porcelain stoneware slab is provided, including a feeding assembly, a powder-preforming box, and a belt conveying assembly, where the belt conveying assembly is horizontally arranged below the powder-preforming box, and the feeding assembly is arranged above the powder-preforming box; the powder-preforming box is arranged at an included angle $\alpha$ with a conveying plane of the belt conveying assembly, and $61° \leq \alpha \leq 90°$, a material-accommodating cavity with opened upper and lower ends is formed in the powder-preforming box, and the opened lower end of the material-accommodating cavity is formed as a discharge gate; and an intersecting line of a lower end of the powder-preforming box and the conveying plane of the belt conveying assembly is at an included angle $\beta$ with a center line of the conveying plane of the belt conveying assembly, and $45° \leq \beta \leq 90°$.

Through the above arrangement, a powder fed in the material-accommodating cavity accumulates and flows in the material-accommodating cavity under its weight to form a fluid-like layout with a fixed accumulation angle. The accumulation angle can be adjusted according to different proportions of raw materials with different particle sizes, and is in a range of 25° to 30°. During distribution, the belt conveying assembly is started, and a raw material in the material-accommodating cavity is discharged from the discharge gate at the lower end and then is distributed on the conveying plane of the belt conveying assembly under the drive of the weight of the raw material and the belt conveying assembly, thereby forming a fluid textured layout. The angle $\beta$ can be set as needed to obtain a diagonal or straight texture effect.

Preferably, the feeding assembly and the powder-preforming box are fixed to an angle adjustment apparatus, an intersecting point of the intersecting line of the lower end of the powder-preforming box and the conveying plane of the belt conveying assembly with the center line of the conveying plane of the belt conveying assembly is an adjustment center, and the angle adjustment apparatus drives the feeding assembly and the powder-preforming box to rotate around the adjustment center for adjustment.

Since the feeding assembly and the powder-preforming box are integrally fixed to the angle adjustment apparatus, the angle adjustment apparatus can drive the feeding assembly and the powder-preforming box as a whole to rotate around the adjustment center, such that an angle of a texture of a ceramic raw material can be easily adjusted according to actual production needs to obtain a porcelain slab with a desired diagonal or straight texture.

Preferably, the powder-preforming box includes a front plate, a back plate, and a side plate connected to both the front plate and the back plate, the back plate and the front plate are arranged sequentially in a conveying direction of the belt conveying assembly, and a spacing between a lower end of the front plate and a conveying surface of the belt conveying assembly is greater than a spacing between a lower end of the back plate and the conveying surface of the belt conveying assembly.

Through the above arrangement, the lower end of the front plate and the lower end of the back plate are arranged in a high and low way to form a linear discharge gate, such that a raw material of an accumulated layout in the material-accommodating cavity and a raw material falling onto the conveying surface of the belt conveying assembly below the material-accommodating cavity can be integrated, which ensures that the raw material of the accumulated layout in the material-accommodating cavity is conformally shaped according to the predetermined position and transferred to the conveying surface of the belt conveying assembly below the material-accommodating cavity.

Preferably, the front plate is further provided with a gate plate which is height adjustable in a vertical direction.

Through the above arrangement, a discharge height of the material-accommodating cavity can be limited by the gate plate to adjust a distribution thickness on the conveying surface of the belt conveying assembly.

Preferably, an adjusting plate is provided in the material-accommodating cavity, an end of the adjusting plate is rotatably arranged on an inner wall of the material-accommodating cavity, and two sides of the adjusting plate are respectively attached to the front plate and the back plate and can slide relative to the front plate and the back plate.

Through the above arrangement, a discharge width of the discharge gate at the lower end of the material-accommodating cavity can be adjusted, that is, a distribution width on the conveying surface of the belt conveying assembly can be adjusted, such as to finally obtain porcelain slabs with different widths.

Preferably, the front plate and/or the back plate each are removably connected with the side plate.

Through the above arrangement, the powder-preforming box can be disassembled and maintained, which is convenient for cleaning and maintenance of the front plate and the back plate.

Preferably, the inner wall of the material-accommodating cavity is covered with a translucent anti-stick film.

Preferably, the feeding assembly includes a plurality of feeding hoppers and a feeding conveyor belt arranged below the a plurality of feeding hoppers, each of the plurality of feeding hoppers includes a storage portion and a feeding portion and is a roller feeding hopper or an electronically-controlled feeding hopper including dot-matrix feeding pores each having a pore size of 3 mm to 20 mm, and a discharge end of the feeding conveyor belt is located directly above the material-accommodating cavity, and an upper end of the material-accommodating cavity is connected to a material-receiving hopper.

Through the above arrangement, the material-receiving hopper can receive a powder conveyed by the feeding conveyor belt and then introduce the powder into the material-accommodating cavity of the powder-preforming box, and the feeding hoppers can be conventional roller feeding hoppers or conventional electronically-controlled feeding hoppers including dot-matrix feeding pores each with a pore size of 3 mm to 20 mm.

Preferably, 2 to 10 feeding hoppers are provided in parallel in a conveying direction of the feeding conveyor belt, the feeding hoppers are roller feeding hoppers, a discharge baffle is provided at an outlet of a feeding portion of each of the feeding hoppers, and each of the feeding hoppers is provided with a drive member configured to drive the discharge baffle to rise and fall vertically to adjust a size of the outlet of the feeding portion.

Through the above arrangement, according to actual production needs, different numbers of feeding hoppers can be provided, which are configured to store raw materials of different colors and different forms, such as a powdery form, a granular form, a flaky form, or a mixed form, and the drive members can drive the discharge baffles to rise and fall to adjust a size of the outlets of the feeding portions by adjusting the position of the discharge baffles, thereby controlling a discharge amount of the feeding hoppers or an open or close state of the feeding hoppers.

Preferably, the discharge baffle is formed as an integrated-type discharge baffle, the drive member drives the integrated-type discharge baffle to rise and fall vertically, a plurality of partitions are provided in each of the feeding hoppers, and the plurality of partitions divide the storage portion into a plurality of storage cavities and further divide the feeding portion into a plurality of feeding spaces corresponding to the plurality of storage cavities;

the plurality of partitions are arranged at intervals in a direction perpendicular to the conveying direction of the feeding conveyor belt, and positions of the plurality of partitions in the arrangement direction are adjustable;

or the discharge baffle is formed as a split-type discharge baffle, the split-type discharge baffle is provided at outlets of the feeding spaces below the storage cavities, and the split-type discharge baffle is provided with drive members correspondingly; and the feeding hoppers of the feeding assembly are selected from the group consisting of a flat roller feeding hopper, a rack roller feeding hopper, a heteromorphic pit carved roller feeding hopper, and any combination of two or more thereof.

When the discharge baffles are formed as an integrated-type, the storage portion of each feeding hopper is divided by the partitions into a plurality of storage cavities, such that ceramic raw materials can be added to different storage cavities. According to the needs of a texture design, a ceramic raw material can be added to a selected storage cavity, and the discharge baffle can be driven by the drive member to rise and fall to control a discharge amount or an open or close state of outlets of feeding portions below one or more storage cavities. When the discharge baffle is formed as a split-type discharge baffle, the drive members are arranged in one-to-one correspondence to drive the discharge baffles to rise and fall, such that a discharge amount or an open or close state of an outlet of a feeding space below a specified storage cavity can be controlled, which achieves flexible and fast control.

According to the needs of a design, the feeding hoppers can be selected from the group consisting of a flat roller feeding hopper, a rack roller feeding hopper, a heteromorphic pit carved roller feeding hopper in the prior art, and any combination of two or more thereof, and can form a laminated layout, a spaced straight layout, or a heteromorphic accumulated layout, such that a raw material can enter a cavity in a variety of forms to finally obtain diversified products.

Preferably, the front plate and the back plate are transparent plates, the front plate or the back plate is provided with one or more detection sensors, and the one or more detection sensors correspondingly control a start/stop state of one or more drive members;

the one or more detection sensors are proximity switches or photoelectric sensors;

the feeding conveyor belt is provided with a deflector rod which is adjustable in angle and retractable; and an adjustable barrier strip is provided in the material-accommodating cavity.

The front plate and the back plate are transparent and one or more detection sensors are arranged on the front plate or the back plate, such that a start/stop state of one or more drive members is controlled by a detection signal of one or more detection sensors. Thus, a program can be set as follows: when one or more detection sensors detect an occlusion signal, actions of one or more drive members are controlled to control a feeding position and a feeding amount of a powder in the material-accommodating cavity, which facilitates the accumulation in the material-accommodating cavity to form various textured layouts, thereby improving the diversification of products. In addition, the use of the detection sensors is conducive to the formation of texture effects of periodic distributing.

Similarly, a liftable or retractable deflector rod is provided on the feeding conveyor belt, and a layout of the raw material is changed before or during feeding to the material-accommodating cavity. An adjustable barrier strip is provided in the material-accommodating cavity, which can further disturb and adjust a layout of a ceramic raw material in the material-accommodating cavity and improve the diversification of raw material layouts to finally obtain porcelain slab products with diversified layouts.

Preferably, the front plate and the back plate each are fabricated from one or two selected from the group consisting of a glass material, a flat belt material, and a resin flat plate material.

Preferably, the front plate or back plate is provided with an adjustment assembly, the detection sensors are arranged on the adjustment assembly, and the adjustment assembly may adjust positions of the detection sensors on the front plate or back plate in a vertical or horizontal direction.

The adjustment assembly is provided to adjust positions of the detection sensors on the front plate or back plate, which facilitates the debugging and the polarity adjustment for the detection sensors according to actual control needs.

Based on the same inventive concept, a second objective of the present disclosure is to provide a manufacturing method of a full-body textured porcelain stoneware slab, where the manufacturing method adopts a pressing machine and the distribution device for a full-body textured porcelain stoneware slab and includes the following steps:

a, device preparation: assembling the conventional pressing machine and the distribution device for a porcelain slab with an full-body green body texture described above to form a ceramic tile production line, selecting an angle α from a range of 61° to 90° and selecting an angle β from a range of 45° to 90°, arranging the distribution device, setting a discharge position, a discharge order, and a discharge amount of the feeding assembly, and setting a height of the discharge gate and a running speed of the belt conveying assembly;

b, raw material preparation: preparing 2 to 10 ceramic raw materials of a single color or various colors and/or preparing powdery materials, granular materials, or flaky materials obtained by pre-pressing and then crushing or roll-cutting the respective ceramic raw materials to feeding materials according to a predetermined ratio, and feeding the feeding materials correspondingly into predetermined feeding hoppers of the feeding assembly, where the feeding materials each are a powder with a sieve residue of 85% or more when sieved through a 60-mesh sieve;

c, device initiation: initiating the feeding conveyor belt, allowing the feeding assembly to operate in accordance with a preset timing sequence to feed the raw materials to the feeding conveyor belt, and conveying the raw materials by the feeding conveyor belt to the material-accommodating cavity of the powder-preforming box;

d, natural flow of the raw materials: allowing the raw materials on the feeding conveyor belt to fall into the material-accommodating cavity through the material-receiving hopper and then to accumulate and flow from top to bottom according to a preset accumulation angle under their own weights of the raw materials to form a slope-like fluid textured powder layout, and storing the raw materials of the fluid textured powder layout in the material-accommodating cavity;

e, distribution: initiating the belt conveying assembly, and allowing the raw materials of the fluid textured powder layout to flow out from the discharge gate at a lower end of the material-accommodating cavity and to be distributed on the conveying plane of the belt conveying assembly, providing a secondary conveyor belt assembly at a feed end of the pressing machine, between which the belt conveying assembly and a transition plate is further provided, and after the belt conveying assembly receives and conveys the raw materials of the fluid textured powder layout to a conveying plane of the secondary conveyor belt assembly, conveying the raw materials of the fluid textured powder layout by the secondary conveyor belt assembly to the pressing machine;

f, pressing: pressing the raw materials by the pressing machine into a green body;

g, drying and sintering: drying the green body, and then sintering the green body in a kiln;

and h, processing: after the sintering, edging and polishing or only edging the sintered green body to obtain a full-body fluid textured porcelain stoneware slab.

Raw materials are first selected according to design requirements and then fed into the powder-preforming box through the feeding assembly, and the raw materials in the powder-preforming box accumulates and flows naturally under their own weights to form a natural fluid textured effect. An accumulation angle of the raw materials can be designed according to proportions of the raw materials, and the powder-preforming box and the feeding assembly are arranged according to the selected angles α and β (a being in the range of 61° to 90°), such that the raw materials fed into the powder-preforming box can flow under their own weights, thereby forming a natural layout. The angle β can be set as needed to form a straight or diagonal textured pattern on the conveying surface of the belt conveying assembly. After the distribution is completed, the raw materials are conveyed to the pressing machine and pressed, then dried, sintered, and processed to obtain a full-body fluid textured porcelain stoneware slab with a natural flowing effect, which meets the actual production and life demands.

Preferably, in the step c, one or more detection sensors are set to correspondingly control one or more drive members to operate, and when a detection sensor at a specified position detects the raw materials, a corresponding drive member is started to drive the discharge baffle to close or open the outlet of the feeding portion.

The detection sensors can be controlled through a program to automatically control the open or close corresponding discharge baffles and the discharge amount, such that a variety of raw material layouts are achieved in the material-accommodating cavity, which is conducive to the fabrication of slabs with diversified textured layouts.

Preferably, in the step f, the pressing machine is a mold cavity-free pressing machine, the secondary conveyor belt assembly directly conveys the raw materials of the fluid textured powder layout to a forming position of the pressing machine, the pressing machine presses the raw materials of the fluid textured powder layout into the green body, the green body is sent to a drying kiln and dried under an action of the secondary conveyor belt assembly, and raw materials of a subsequent fluid textured powder layout enter the next round of green body formation under the action of the secondary conveyor belt assembly, thereby forming a cycle of distribution, pressing, and delivering the continuously prepared green bodies to the drying kiln for drying.

In the pressing procedure, the existing mold cavity-free pressing machine may be used. After the belt conveying assembly receives the distributed raw materials with fluidity, the raw materials are conveyed to the conveying plane of the secondary conveyor belt assembly and then directly conveyed by the secondary conveyor belt assembly to a forming position of the pressing machine, and the pressing machine presses the raw materials. A cyclic feeding and pressing process can be achieved through the secondary conveyor belt assembly, which renders the structure is simple.

Preferably, in the step f, the pressing machine is a stamping pressing machine with a mold cavity, the secondary conveyor belt assembly is a retractable movable conveyor belt, when the secondary conveyor belt assembly moves forward to a mold cavity position of the pressing machine, the raw materials of the fluid textured powder layout fall into the mold cavity of the pressing machine, and after the distribution, the secondary conveyor belt assembly immediately retracts to a position below the belt conveying assembly for a next round of material-receiving and distributing; and when the secondary conveyor belt assembly leaves the mold cavity position of the pressing machine, the pressing machine starts stamping to form a green body, raw materials of a fluid textured powder layout received in a next round move forward with the secondary conveyor belt assembly, the green body previously pressed is pushed out of the pressing machine, and a next round of distribution is conducted, thereby forming a cycle of distribution, pressing, and delivering the continuously prepared green bodies to the drying kiln for drying.

In the pressing procedure, the existing stamping pressing machine with a mold cavity may also be used, and the retractable movable conveyor belt in the prior art is used as the secondary conveyor belt assembly. In the pressing procedure, the secondary conveyor belt assembly moves forward to the mold cavity position of the pressing machine such that the received ceramic raw materials are fed into the mold cavity; then the secondary conveyor belt assembly is retracted to a position below the belt conveying assembly to receive raw materials for the next round of distribution, and after the secondary conveyor belt assembly leaves the mold cavity position, the pressing machine presses the raw materials in the mold cavity to form a green body; and the next round of feeding of the secondary conveyor belt assembly pushes the green body formed in the previous round of pressing away from the pressing machine, and distribution is conducted at the mold cavity position, thereby forming cyclic feeding and pressing.

Preferably, in the step b, the feeding hoppers of the feeding assembly comprises pit carved roller feeding hoppers and flat roller feeding hoppers; or in step b, the raw materials on the feeding conveyor belt are deflected by the deflector rod to adjust a layout of the raw materials on the feeding conveyor belt, or the raw materials are disturbed when falling into the material-accommodating cavity, such that a layout of the raw materials in the material-accommodating cavity changes; or in step c, in the material-accommodating cavity of the powder-preforming box, a position of the barrier strip is adjusted to make a layout of the raw materials in the material-accommodating cavity change; or in step b, positions of the partitions in the feeding hoppers and/or one or more discharge baffles of the split-type discharge baffles are adjusted to adjust feeding widths, feeding positions, and feeding amounts of the feeding hoppers and thus make the raw materials enter the material-accommodating cavity to form different accumulation surfaces, such that accumulation and flow patterns of the raw materials in the material-accommodating cavity change.

In such arrangement, the feeding hoppers of the feeding assembly comprise pit carved roller feeding hoppers and flat roller feeding hoppers, so that the positions of the raw materials on the feeding conveyor belt and the layouts and positions of the raw materials scheduled to enter the material-accommodating cavity can undergo controllable new changes. By moving or pulling the deflector rod, raw materials on the feeding conveyor belt or raw materials falling from the feeding conveyor belt to the material-accommodating cavity are disturbed, such that a layout of the raw materials after entering the material-accommodating cavity can also be changed and thus a layout of the raw materials can be changed. Similarly, by adjusting the barrier strip, or by adjusting positions of the partitions and moving different discharge baffles, the accumulation and flow patterns of the raw materials in the material-accommodating cavity can be changed, which improves the diversification of products.

Preferably, between the steps f and g, the green body is sent to a glazing procedure for ink jet of a predetermined pattern, application of a glaze, and surface decoration with a dry granular material.

With such arrangement, after entering the glazing procedure, the green body is subjected to ink jet of a predetermined pattern, application of a glaze, and surface decoration with a dry granular material, which enriches the surface effects of products.

Compared with the prior art, the present disclosure achieves the following beneficial technical effects:

1. The present disclosure provides a distribution device, where the powder-preforming box is arranged at an angle of 61° to 90° on the conveying plane of the belt conveying assembly, such that there is sufficient potential energy for the flow of a raw material under its own weight and thus the raw material has a prominent natural flowing effect. In addition, a material distributing angle of the powder-preforming box can be adjusted according to the requirements of a predetermined design to form a straight or diagonal full-body green body texture, such that a slope-like flowing effect texture under gravity can be achieved, and technical and product effects with adjustable diagonal and straight angles can also be achieved, which enriches the natural sandstone-imitated patterns to meet diversified needs, achieves a full-body effect from bottom to surface that is in great market demand in aspects such as paving, edging, cutting, and dry-hanging, and greatly expands the applicability. Moreover, a powder on the feeding conveyor belt flows under the promotion of a conveying force of the feeding conveyor belt and a raw material in the material-accommodating cavity flows from top to bottom under gravity along an accumulation angle to form a texture, and the texture perfectly imitates the magma melt-flow forming principle and the layered blending and stacking of natural sandstone, and has a natural smooth full-body textured pattern effect, which is staggered and colorful, and has adjacent color layers blended with each other, a natural transition, and controllable random changes.

2. In the distribution device of the present disclosure, two sides of the discharge gate of the powder-preforming box are arranged in a high and low way. This gate plate design allows an accumulated raw material in the material-accommodating cavity to conformally fall to a plane under gravity, as if the accumulated raw material is copied to the plane, such that the raw material that has been accumulated and formed presents a natural flowing effect in the material-accommodating cavity, which overcomes the problem in the prior art that, when an arc corner is used for the distribution by a longitudinal material-receiving cavity (namely, the conformal feeding with an arc plate known in the industry), if the sand-like powder with a sieve residue of 85% or more when sieved through a 60-mesh sieve in the present disclosure is used, the accumulated raw materials of different colors will be thoroughly mixed and thus feeding materials of different colors falling from different single-color material feeding modules cannot retain a clearly-layered effect. In the present disclosure, the above-mentioned powders of different colors and sand particle sizes can be used instead of a micro-powder to produce a product with a controllable colorful green body texture, which avoids environmental and occupational health problems such as dust pollution and crushing noise caused by the use of a micro-powder to produce a green body texture. In addition, a gate plate with an adjustable height is arranged, and a material thickness can be adjusted through the rise and fall of the gate plate to form raw material layouts of different thicknesses.

3. The present disclosure provides a manufacturing method of a full-body textured porcelain stoneware slab, in which the feeding hoppers of the feeding assembly are arranged to operate at a preset operating frequency, a preset interval, or preset intermittent frequency hopping, and a preset partitioned feeding manner is used to feed feeding materials to the feeding conveyor belt according to the predetermined zone, order, material amount, and falling form. In addition, by adjusting different discharge baffles or by controlling an action of one or more corresponding drive members when a signal from one or more detection sensors arranged on the front plate or back plate is received, a feeding position and a feeding amount are automatically controlled, such that the options for colors, widths, and amounts of raw materials entering the cavity are diversified, which provides a basis for various changes in program parameters for these controls and thus provides changeable raw material layouts formed under program control, thereby intelligently achieving plate effects with rich texture layouts.

4. In the manufacturing method of the present disclosure, pit carved roller feeding hoppers and flat roller feeding hoppers are adopted as the feeding hoppers, such that positions of raw materials on the feeding conveyor belt and layouts and positions of raw materials scheduled to enter the cavity can undergo controllable new changes. By moving or pulling the deflector rod, a raw material on the feeding conveyor belt or a raw material falling from the feeding conveyor belt to the material-accommodating cavity is disturbed; or by adjusting the barrier strip or by adjusting positions of the partitions and different discharge baffles to adjust different feeding positions and material amounts, different slope surfaces for controlling the feeding into the material-accommodating cavity are formed, such that the accumulation and flow patterns of a raw material in the material-accommodating cavity can be changed. Thus, full-body fluid textured porcelain stoneware slabs that have consistent main bodies, slope textures, and color variations can be produced according to a pre-design during continuous production, which presents a natural stone effect in cooperation with a natural flowing textured trend, resulting in rich natural surface patterns.

5. In the manufacturing method of the present disclosure, the combination of a full-body green body textured pattern and an inkjet pattern is adopted to achieve the combination of advantages of real green body elements and colorful inkjet effects, which makes a produced stone-imitated ceramic product lifelike, beautiful, and practical.

6. The distribution device of the present disclosure can realize the production of multi-functional products, has a compact structure and a small floor space, and mainly adopts a powder with a sieve residue of 85% or more when sieved through a 60-mesh sieve, which results in less dust than the micro-powder solution. Therefore, the distribution device of the present disclosure greatly improves the production environment while providing a manufacturing technique and structure for a product with a lifelike natural sandstone effect.

7. In the present disclosure, the feeding assembly is provided comprising one or more feeding hoppers, and the feeding hoppers may each be an electronically-controlled feeding hopper including dot-matrix feeding pores each with a pore size of 5 mm to 20 mm, which allows the free fine control of a feeding amount and the combination, thereby achieving many digitally-controlled feeding effects.

Figure 1:
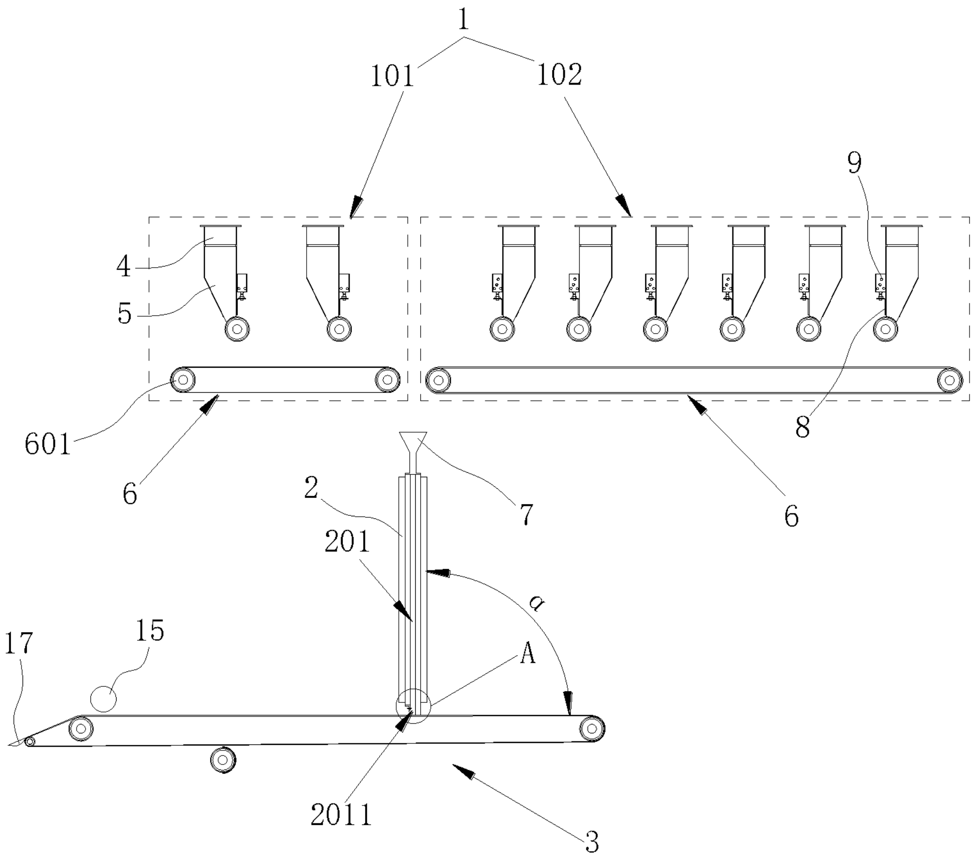
FIG. 1 is a schematic plan view illustrating an overall structure of a distribution device in an embodiment of the present disclosure.

Reference numerals in the figures represent technical features as follows:

1: feeding assembly; 101: line powder feeding module; 1011: first feeding hopper; 1012: second feeding hopper; 102: texture powder feeding module; 1021: third feeding hopper; 1022: fourth feeding hopper; 1023: fifth feeding hopper; 1024: sixth feeding hopper; 1025: seventh feeding hopper; 1026: eighth feeding hopper;

2: powder-preforming box; 201: material-accommodating cavity; 2011: discharge gate; 2012: adjusting plate; 2013: barrier strip; 202: front plate; 2021: gate plate; 2022: connecting screw; 203: back plate;

3: belt conveying assembly;

4: storage portion; 4011.1, 4011.2, 4011.3, 4011.4, 4011.5, 4012.1, 4012.2, 4012.3, 4012.4, 4012.5, 4013.1, 4013.2, 4013.3, 4013.4, 4013.5, 4014.1, 4014.2, 4014.3, 4014.4, 4014.5, 4015.1, 4015.2, 4015.3, 4015.4, 4015.5, 4016.1, 4016.2, 4016.3, 4016.4, 4016.5, 4017.1, 4017.2, 4017.3, 4017.4, 4017.5, 4018.1, 4018.2, 4018.3, 4018.4, and 4018.5: storage cavities;

5: feeding portion;

6: feeding conveyor belt; 601: conveyor roller;

7: material-receiving hopper;

8, 1011.1, 1011.2, 1011.3, 1011.4, 1011.5, 1012.1, 1012.2, 1012.3, 1012.4, 1012.5, 1021.1, 1021.2, 1021.3, 1021.4, 1021.5, 1022.1, 1022.2, 1022.3, 1022.4, 1022.5, 1023.1, 1023.2, 1023.3, 1023.4, 1023.5, 1024.1, 1024.2, 1024.3, 1024.4, 1024.5, 1025.1, 1025.2, 1025.3, 1025.4, 1025.5, 1026.1, 1026.2, 1026.3, 1026.4, and 1026.5: discharge baffles;

9: drive member;

10: partition;

11, 1101.1, 1101.2, 1101.3, 1101.4, 1101.5, 1101.6, 1101.7, 1101.8, and 1101.9: detection sensors;

12: deflector rod;

13: adjustment assembly; 1301: fixing plate; 13011: adjusting chute; 1302: adjusting column; 1303: adjusting nut;

14: pressing machine;

15: pressing roller;

16: secondary conveyor belt assembly; 1601: frame feeding grille;

17: transition plate;

18: porcelain slab; 1801: line zone; 1802: texture zone; 1803: line change zone; 1804: texture change zone;

19: full-body fluid textured layout;

20: raw material layout of a belt conveying assembly at an angle β of 60°;

22: raw material layout of a belt conveying assembly at an angle β of 75°;

23: raw material layout of a belt conveying assembly at an angle β of 45°; and

24: peak-like textured powder layout.

DETAILED DESCRIPTION

In order to make the objectives, technical solutions, and advantages of the present disclosure more comprehensible, the present disclosure is further described in detail below in conjunction with examples, but the protection scope of the present disclosure is not limited to the following specific examples.

Example 1

Figure 2:
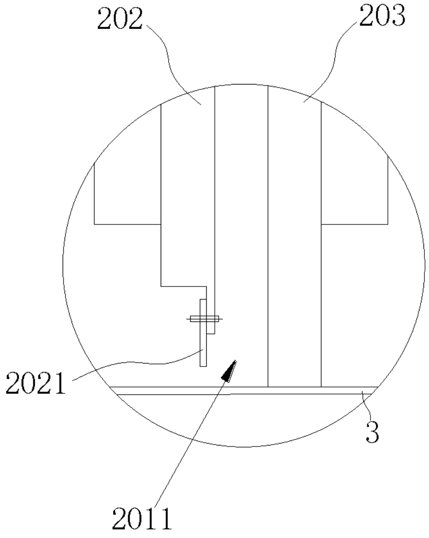
FIG. 2 is an enlarged view of part A in FIG. 1.
Figure 4:
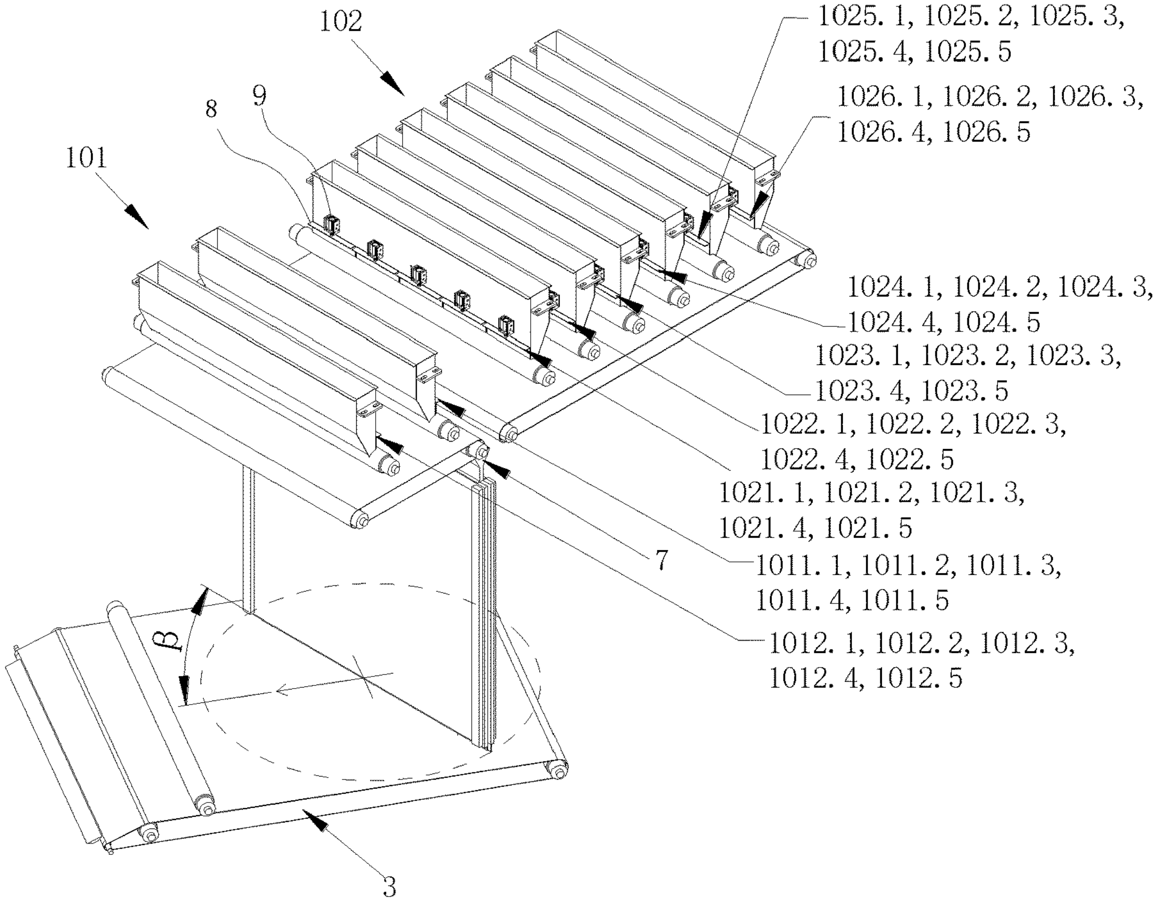
FIG. 4 is a schematic three-dimensional (3D) view illustrating an overall structure of a distribution device in an embodiment of the present disclosure.

As shown in FIG. 1, FIG. 2, and FIG. 4, a distribution device for a full-body textured porcelain stoneware slab is disclosed in this example, including a feeding assembly 1, a powder-preforming box 2, and a belt conveying assembly 3, wherein the belt conveying assembly 3 is a common conveyor belt in the prior art and is horizontally arranged below the powder-preforming box 2. The feeding assembly 1 is arranged above the powder-preforming box 2, the powder-preforming box 2 is arranged at an included angle α with a conveying plane of the belt conveying assembly 3, and 61°≤α≤90°, such as 65°, 70°, 75°, 80°, and 85°;

A material-accommodating cavity 201 with opened upper and lower ends is formed in the powder-preforming box 2, and the opened lower end of the material-accommodating cavity 201 is formed as a discharge gate 2011; and an intersecting line of a lower end of the powder-preforming box 2 and the conveying plane of the belt conveying assembly 3 is at an included angle β with a center line of the conveying plane of the belt conveying assembly 3, and 45°≤β≤90°, such as 60° and 75°.

In this example, the feeding assembly 1 and the powder-preforming box 2 are fixed to an angle adjustment apparatus (not shown in the figures), an intersecting point of the intersecting line of the lower end of the powder-preforming box 2 and the conveying plane of the belt conveying assembly 3 with the center line of the conveying plane of the belt conveying assembly 3 is an adjustment center, and the angle adjustment apparatus drives the feeding assembly 1 and the powder-preforming box 2 to rotate around the adjustment center for adjustment.

The angle adjustment apparatus includes a rotating motor (not shown in the figures) and a rotating disk (not shown in the figures). The rotating disk can be rotatably arranged on a bracket (not shown in the figures), and the feeding assembly 1 and the powder-preforming box 2 both are fixed to the rotating disk. The rotating motor can drive the rotating disk to rotate, thereby adjusting the angle β. In order to facilitate the rotation of the rotating disk, a common speed reduction assembly in the prior art (not shown in the figures) can be connected to the rotating motor.

Refer to FIG. 1 and FIG. 4. The feeding assembly 1 includes a line powder feeding module 101 and a texture powder feeding module 102. In this example, the line powder feeding module 101 and the texture powder feeding module 102 are arranged at two sides of the powder-preforming box 2, respectively. In other examples, the line powder feeding module 101 and the texture powder feeding module 102 may be arranged side by side at one side of the powder-preforming box 2.

Refer to FIG. 1 and FIG. 2. The powder-preforming box 2 includes a front plate 202, a back plate 203, and a side plate (not shown in the figures), wherein two sides of the side plate are connected to the front plate 202 and the back plate 203, respectively, the back plate 203 and the front plate 202 are arranged sequentially in a conveying direction of the belt conveying assembly 3, the front plate 202 and/or the back plate 203 are/is removably connected to the side plate, and the front plate 202 and/or the back plate 203 may be connected to the side plate through a screw (not shown in the figures) or a screw bolt assembly (not shown in the figures).

Refer to FIG. 2. A spacing between a lower end of the front plate 202 and a conveying surface of the belt conveying assembly 3 is greater than a spacing between a lower end of the back plate 203 and the conveying surface of the belt conveying assembly 3, and the discharge gate 2011 is formed through the lower end of the front plate 202 and the lower end of the back plate 203. In this example, the lower end of the back plate 203 is attached to the conveying surface of the belt conveying assembly 3.

Refer to FIG. 2. The front plate 202 is further provided with a gate plate 2021 which is height adjustable in a vertical direction. In this example, an adjusting slot (not shown in the figure) is formed in the gate plate 2021 in a vertical direction, and the gate plate 2021 is fixed to the front plate 202 by a connecting screw 2022 through the adjusting slot.

Figure 3:
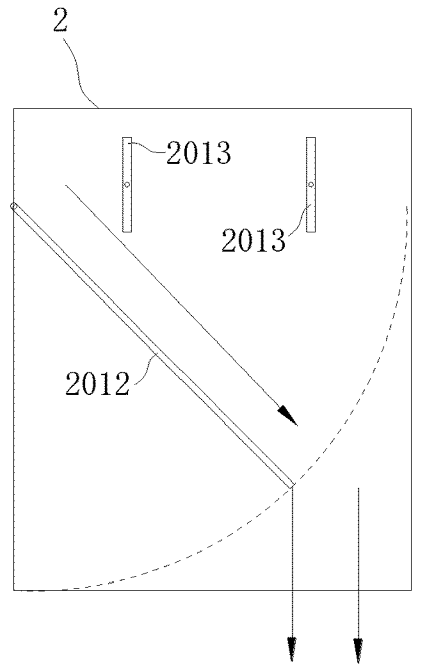
FIG. 3 is a schematic structural diagram of a powder-preforming box in an embodiment of the present disclosure.

Refer to FIG. 2 and FIG. 3. A flow direction of a ceramic raw material in the powder-preforming box 2 is indicated by arrows in FIG. 3. An adjusting plate 2012 is provided in the material-accommodating cavity 201, an end of the adjusting plate 2012 is rotatably arranged on an inner wall of the material-accommodating cavity 2, and two side walls of the adjusting plate 2012 are respectively attached to the front plate 202 and the back plate 203, such that a plate surface of the adjusting plate 2012 can receive a raw material falling into the material-accommodating cavity 201 and a width of a raw material discharged from the discharge gate 2011 can be adjusted.

Refer to FIG. 3. A barrier strip 2013 is also rotatably provided in the material-accommodating cavity 201, two side walls of the barrier strip 2013 are respectively attached to the front plate 202 and the back plate 203. An adjusting shaft (not shown in the figures) may be connected along a rotation axis of the barrier strip 2013, and the adjusting shaft penetrates through the front plate 202 or the back plate 203. With the rotation of the adjusting shaft, the barrier strip 2013 can rotate to disturb a ceramic raw material in the material-accommodating cavity 201, thereby changing a raw material layout in the material-accommodating cavity 201.

The inner wall of the material-accommodating cavity may further be covered with a translucent anti-stick film (not shown in the figures).

Refer to FIG. 1 and FIG. 4. The feeding assembly 1 includes a plurality of feeding hoppers (not marked respectively in the figures) and a feeding conveyor belt 6 arranged below the feeding hoppers. Each of the plurality of feeding hoppers includes a storage portion 4 and a corresponding feeding portion 5 arranged under the storage portion 4. The feeding hoppers can be roller feeding hoppers in the prior art, and an exemplary structure of a roller feeding hopper refers to the Chinese Patent Application No. 201520578566.2.

The feeding hoppers can also be electronically-controlled feeding hoppers including dot-matrix feeding pores each having a pore size of 3 mm to 20 mm in the prior art, and an exemplary structure of an electronically-controlled feeding hopper can refer to the Chinese Patent Application No. 201711459981.6.

A discharge end of the feeding conveyor belt 6 is located directly above the material-accommodating cavity 201, and an upper end of the material-accommodating cavity 201 is connected to a material-receiving hopper 7.

Refer to FIG. 1. 2 to 10 feeding hoppers are provided in parallel in a conveying direction of the feeding conveyor belt 6.

The feeding hoppers are roller feeding hoppers. A discharge baffle 8 is provided at an outlet of a feeding portion 5 of each of the feeding hoppers below a corresponding storage portion 4. The feeding portion 5 is provided with a drive member 9 configured to drive the discharge baffle 8 to rise and fall vertically to adjust a size of the outlet of the feeding portion 5. The drive member 9 can be one selected from the group consisting of an electric push rod, a pneumatic telescopic rod, and a hydraulic telescopic rod.

Figure 8:
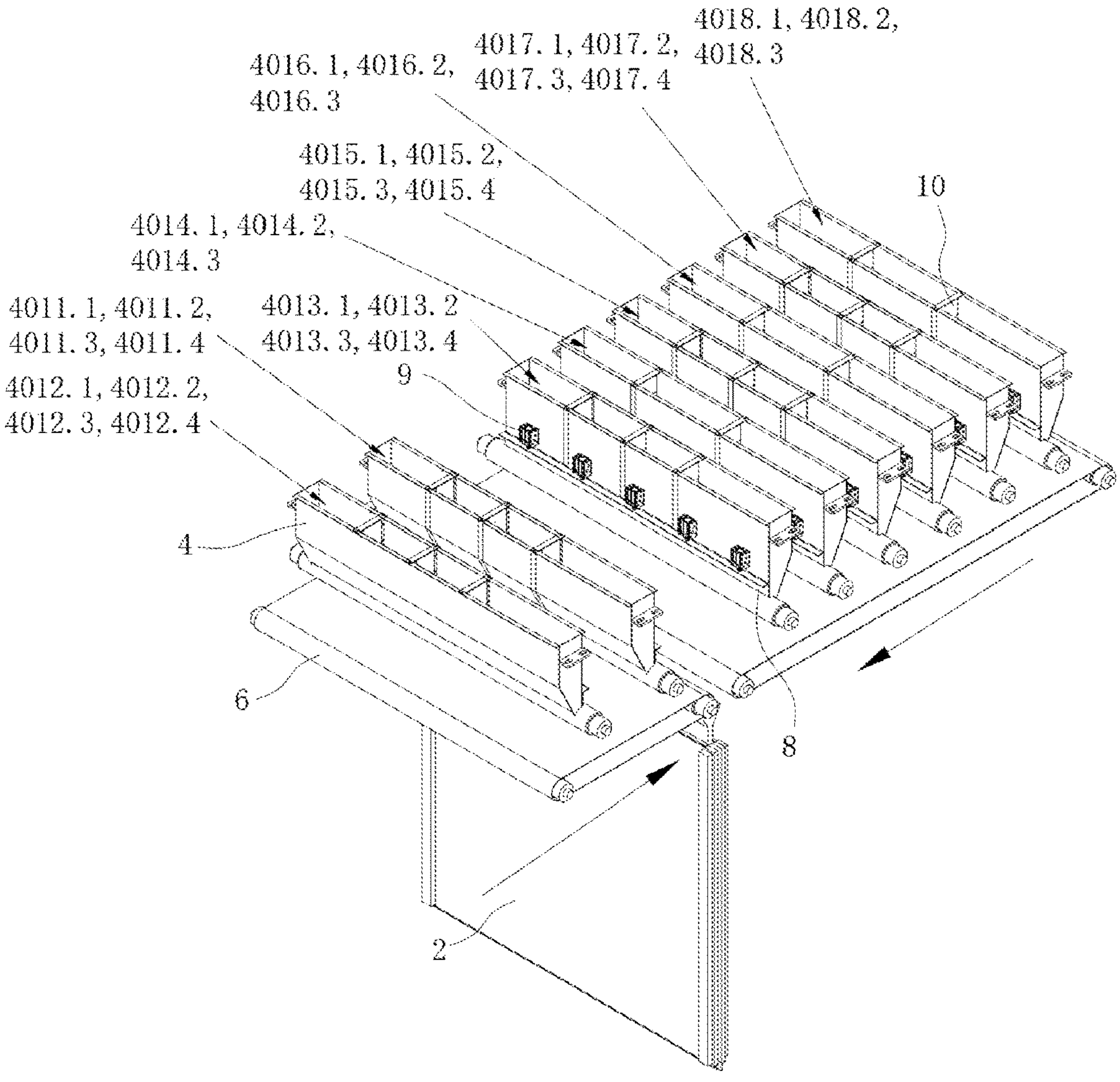
FIG. 8 is a schematic diagram illustrating an overall 3D structure of a distribution device with an integrated-type discharge baffle in an embodiment of the present disclosure.

Refer to FIG. 8. The discharge baffle 8 may be formed as an integrated-type discharge baffle. The drive member 9 drives the integrated-type discharge baffle 8 to rise and fall vertically. A plurality of partitions 10 are provided in each of the feeding hoppers to divide the storage portion 4 into a plurality of storage cavities and further to divide the feeding portion 5 below the storage portion 4 into a plurality of feeding spaces corresponding to the plurality of storage cavities.

The plurality of partitions 10 are arranged at intervals in a direction perpendicular to the conveying direction of the feeding conveyor belt 6, and positions of the plurality of partitions 10 in the arrangement direction are adjustable.

Refer to FIG. 4. Alternatively, the discharge baffle 8 may be formed as a split-type discharge baffle. the split-type discharge baffle 8 is provided at outlets of the feeding spaces below the storage cavities, and the split-type discharge baffle 8 is provided with the drive members 9 correspondingly.

The feeding hopper of the feeding assembly 1 are selected from the group consisting of a flat roller feeding hopper, a rack roller feeding hopper, a heteromorphic pit carved roller feeding hopper, and any combination of two or more thereof.

Figure 15:
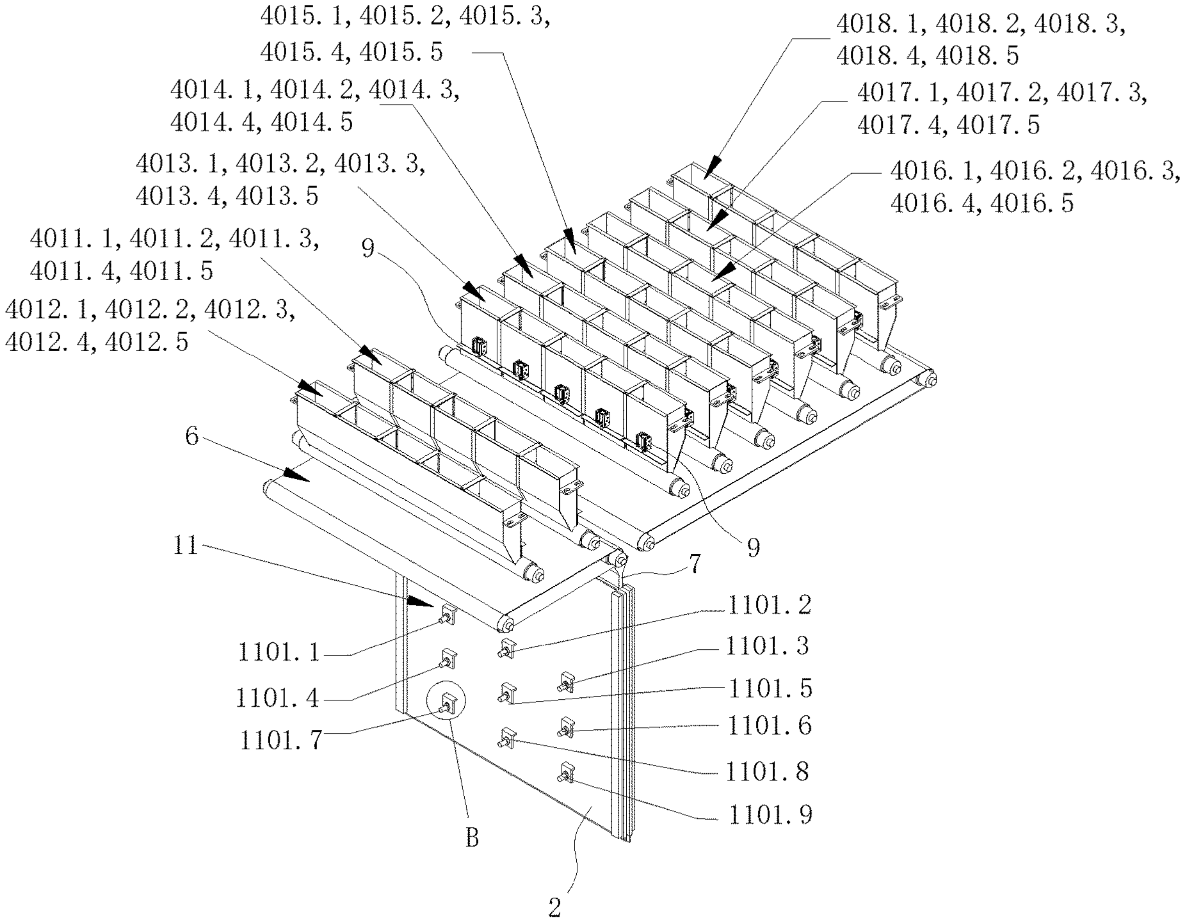
FIG. 15 is a schematic diagram illustrating an overall 3D structure of a distribution device with a split-type discharge baffle in an embodiment of the present disclosure.

Refer to FIG. 15. The front plate 202 and the back plate 203 are transparent plates, the front plate 202 or the back plate 203 is provided with one or more detection sensors 11, and the one or more detection sensors 11 correspondingly control a start/stop state of one or more drive members 9, that is, one detection sensor 11 controls the start/stop of one or more drive members 9 or a plurality of detection sensors 11 control the start/stop of one or more drive members 9.

In this example, the one or more detection sensors 11 are proximity switches or photoelectric sensors.

Refer to FIG. 1. The feeding conveyor belt 6 includes a conveyor roller 601 and a conveyor belt (not marked in the figures) driven by the conveyor roller 601 to move cyclically.

Figure 5:
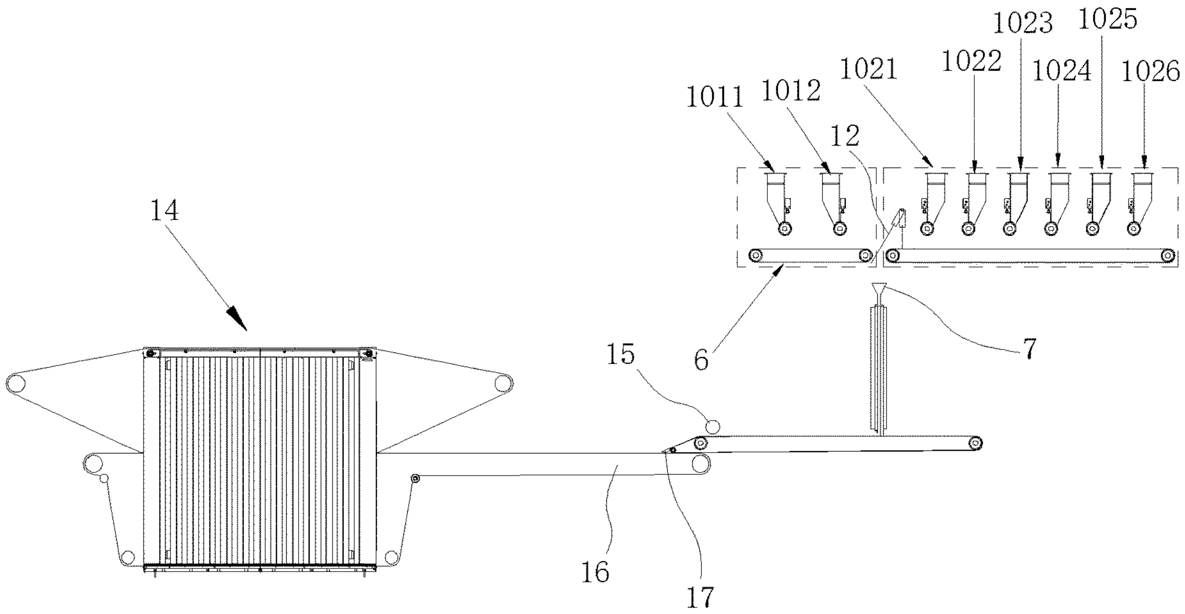
FIG. 5 is a schematic structural diagram of a ceramic production line in Example 2 of the present disclosure.

Refer to FIG. 5. A retractable deflector rod 12 is provided above the feeding conveyor belt 6. The deflector rod 12 can swing relative to the feeding conveyor belt 6, such that an angle of the deflector rod can be adjusted. An axis around which the deflector rod 12 swings is parallel to an axis of the conveyor roller 601. The deflector rod 12 also can move along an axis parallel to the conveyor roller 601, such that the deflector rod 12 can be adjusted to a suitable angle, for example, the deflector rod 12 is adjusted to a position above the material-receiving hopper 7 and between the line powder feeding module 101 and the texture powder feeding module 102. By moving the deflector rod 12 along the axis parallel to the conveyor roller 601, a raw material on the feeding conveyor belt 6 is disturbed during a falling-off process to adjust a raw material layout, thereby producing diversified layouts. Alternatively, the deflector rod 12 is adjusted to be perpendicular to or at a specified angle with the conveying plane of the feeding conveyor belt 6, and the deflector rod 12 is extended and thus is attached to the conveying surface of the feeding conveyor belt 6, such that a raw material on the conveying plane of the feeding conveyor belt 6 is disturbed to change a raw material layout on the feeding conveyor belt 6 and thus change a raw material layout falling into the powder-preforming box 2. In other examples, the deflector rod 12 can also rise and fall vertically relative to the conveying plane of the feeding conveyor belt 6.

In this example, the front plate 202 and the back plate 203 each are fabricated from one or two selected from the group consisting of a glass material, a flat belt material, and a resin flat plate material. For example, the front plate 202 and the back plate 203 may each be glass, or the front plate and the back plate are fabricated from glass and a flat belt, respectively.

Figure 16:
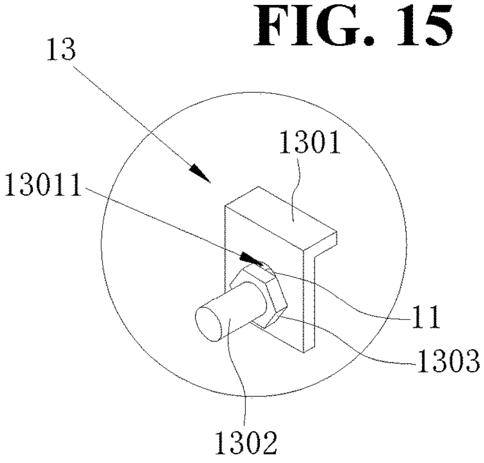
FIG. 16 is an enlarged view of part B in FIG. 15.

Refer to FIG. 15 and FIG. 16. The front plate 202 or the back plate 203 is provided with an adjustment assembly 13, a detection sensor 11 is provided on the adjustment assembly 13, and the adjustment assembly 13 can adjust a position of the detection sensor 11 on the front plate 202 or the back plate 203 in a vertical or horizontal direction.

The adjustment assembly 13 includes a fixing plate 1301, an adjusting bolt 1302, and an adjusting nut 1303. The fixing plate 1301 is fixedly connected to the front plate 202 or the back plate 203. An adjusting chute 13011 is formed in the fixing plate 1301 extending in horizontal and vertical crossing directions. the detection sensor 11 is fixed to the adjusting bolt 1302, and the adjusting bolt 1302 can move along the adjusting chute 13011. An external thread (not shown in the figures) is formed on an outer wall of the adjusting bolt 1302, and the adjusting nut 1303 is in threaded connection with the adjusting bolt 1302. The adjusting bolt 1302 is fixed to the fixing plate 13011 through the adjusting nut 1303.

Example 2

Refer to FIG. 5. A manufacturing method of a full-body textured porcelain stoneware slab is disclosed in this example, and the manufacturing method adopts the distribution device for a full-body textured porcelain stoneware slab in Example 1 and a pressing machine 14 in the prior art.

The manufacturing method includes the following steps.

a, Device preparation: A conventional pressing machine 14 and the distribution device for a full-body textured porcelain stoneware slab in Example 1 are assembled to form a ceramic tile production line. The line powder feeding module 101 includes 2 feeding hoppers, and the texture powder feeding module 102 includes 6 feeding hoppers. The feeding hoppers of both the line powder feeding module 101 and the texture powder feeding module 102 are flat roller feeding hoppers. 5 feeding spaces are provided below a storage portion 4 of each feeding hopper, and 5 discharge baffles 8 are provided corresponding to the 5 feeding spaces. The drive member 9 is an electric push rod, and the electric push rod 9 can be controlled to extend and retract to control the open and close and the size of openings of the feeding spaces, thereby achieving the selective feeding and controlling a feeding amount.

Refer to FIG. 4. Each of the feeding hoppers of the line powder feeding module 101 and the texture powder feeding module 102 includes a storage portion 4 and 5 feeding spaces provided under the storage portion 4. The line powder feeding module 101 includes a first feeding hopper 1011 and a second feeding hopper 1012 which are arranged sequentially away from the material-receiving hopper 7. An outlet of the first feeding hopper 1011 is provided with 5 discharge baffles 1011.1, 1011.2, 1011.3, 1011.4, and 1011.5. An outlet of the second feeding hopper 1012 is provided with 5 discharge baffles 1012.1, 1012.2, 1012.3, 1012.4, and 1012.5. The feeding of the first feeding hopper 1011 and the second feeding hopper 1012 is respectively controlled by the first discharge baffles from the right in the conveying direction of the feeding conveyor belt 6, namely, 1011.1 and 1012.1.

The texture powder feeding module 102 includes a third feeding hopper 1021, a fourth feeding hopper 1022, a fifth feeding hopper 1023, a sixth feeding hopper 1024, a seventh feeding hopper 1025, and an eighth feeding hopper 1026 that are arranged sequentially away from the material-receiving hopper 7. An outlet of the third feeding hopper 1021 is provided with 5 discharge baffles 1021.1, 1021.2, 1021.3, 1021.4, and 1021.5, an outlet of the fourth feeding hopper 1022 is provided with 5 discharge baffles 1022.1, 1022.2, 1022.3, 1022.4, and 1022.5, an outlet of the fifth feeding hopper 1023 is provided with 5 discharge baffles 1023.1, 1023.2, 1023.3, 1023.4, and 1023.5, an outlet of the sixth feeding hopper 1024 is provided with 5 discharge baffles 1024.1, 1024.2, 1024.3, 1024.4, and 1024.5, an outlet of the seventh feeding hopper 1025 is provided with 5 discharge baffles 1025.1, 1025.2, 1025.3, 1025.4, and 1025.5, and an outlet of the eighth feeding hopper 1026 is provided with 5 discharge baffles 1026.1, 1026.2, 1026.3, 1026.4, and 1026.5. The feeding of the third feeding hopper 1021, the fifth feeding hopper 1023, and the seventh feeding hopper 1025 is respectively controlled by the first discharge baffles from the left in the conveying direction of the feeding conveyor belt 6, namely, 1021.1, 1023.1, and 1025.1.

Figure 6:
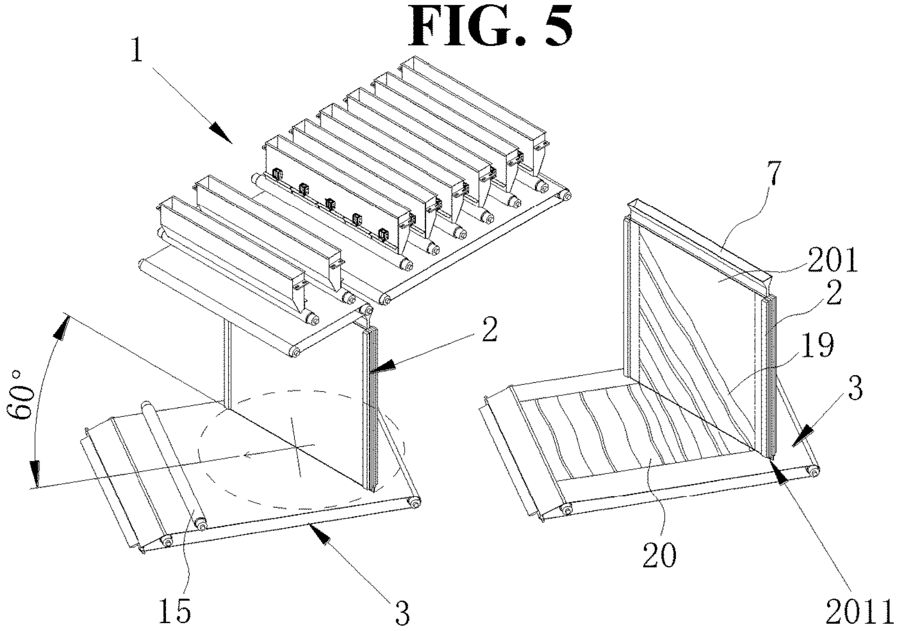
FIG. 6 shows a schematic structural diagram and a feeding state diagram of a distribution device with an angle β of 60° in an embodiment of the present disclosure.

Refer to FIG. 6. The angle $\alpha$ is set to 90° and the angle $\beta$ is set to 60°.

A discharge position, a discharge order, and a discharge amount of the feeding assembly 1, a height of the discharge gate 2011, and a running speed of the belt conveying assembly 3 are set.

b, Raw material preparation: 2 to 10 ceramic raw materials of a single color or various colors, and/or powdery materials, granular materials, or flaky materials obtained by pre-pressing and then crushing or roll-cutting the ceramic raw materials are prepared to feeding materials according to a predetermined ratio.

In this example, the feeding materials each are a powder with a sieve residue of 85% or more when sieved through a 60-mesh sieve. Dark-gray, light-gray, black, and white materials are adopted. The dark-gray, light-gray, and black materials are mixed inhomogeneously and then pre-pressed and crushed to obtain a mixture of powdery, flaky, and granular materials. The dark-gray and light-gray materials are mixed to obtain a mixture. The dark-gray and black materials are mixed to obtain a mixture, and the light-gray and black materials are mixed to obtain a mixture; and all the mixtures are fed into the feeding hoppers of the texture powder feeding module. The third feeding hopper 1021 is filled with the dark-gray material, the fourth feeding hopper 1022 is filled with the mixture of the dark-gray and black materials, the fifth feeding hopper 1023 is filled with the light-gray material, the sixth feeding hopper 1024 is filled with the mixture of powdery, flaky, and granular materials obtained by inhomogeneously mixing and then pre-crushing the dark-gray, light-gray, and black materials, the seventh feeding hopper 1025 is filled with the mixture of the dark-gray and light-gray materials, the eighth feeding hopper 1026 is filled with the mixture of the light-gray and black materials, the first feeding hopper 1011 is filled with the white material, and the second feeding hopper 1012 is filled with the black material.

c, Device initiation: The feeding conveyor belt 6 is initiated, the feeding assembly 1 operates in accordance with a preset timing sequence to feed the raw materials to the feeding conveyor belt 6, and the raw materials are conveyed by the feeding conveyor belt 6 to the material-accommodating cavity 201 of the powder-preforming box 2.

Running speeds of the feeding conveyor belt 6 below the line powder feeding module 101 and the feeding conveyor belt 6 below the texture powder feeding module 102 are set according to design requirements.

A roller motor of each feeding hopper in the texture powder feeding module 102 allows a texture material in the feeding hopper to fall onto the feeding conveyor belt 6 below the texture powder feeding module 102 according to preset running and pause times, and a roller motor of each feeding hopper in the line powder feeding module 101 allows a line material in the feeding hopper to fall onto the feeding conveyor belt 6 below the line powder feeding module 101 according to preset running and pause times, during which, due to the different preset running and pause times, the raw materials of different colors are not overlapped, partially overlapped, or semi overlapped on the feeding conveyor belt 6.

d, Natural flow of the raw materials: The texture material on the feeding conveyor belt below the texture powder feeding module 102 falls into the material-accommodating cavity through the material-receiving hopper 7 at an opening of the upper end of the powder-preforming box 2, and the line material on the feeding conveyor belt 6 below the line powder feeding module 101 also falls into the material-accommodating cavity 201 through the material-receiving hopper 7 during a predetermined pause interval of the feeding conveyor belt 6 below the texture powder feeding module 102, such as 0.5 ms and 1 ms. The above raw materials accumulate and flow with a corresponding feeding width along an accumulation angle in the material-accommodating cavity 201 to form a full-body fluid textured layout 19. The accumulation angle of the raw materials is adjusted to 30° through the blending of the raw materials.

e, Distribution: The belt conveying assembly 3 is initiated, and the raw materials of the full-body fluid textured layout 19 are allowed to flow out from the discharge gate 2011 at a lower end of the material-accommodating cavity 201 and are distributed on the conveying plane of the belt conveying assembly 3. In FIG. 6, 20 indicates a raw material layout on the belt conveying assembly when the angle β is 60°. A size of the discharge gate 2011 matches a running speed of the belt conveying assembly 3, such that the raw materials discharged from the discharge gate 2011 are distributed on the conveying plane of the belt conveying assembly 3 under their weights with a uniform thickness.

A pressing roller 15 is further provided on the middle of or at a discharge port of the belt conveying assembly 3, and the pressing roller 15 presses the raw materials for conforming. A feed end of the pressing machine 14 is further provided with a secondary conveyor belt assembly 16, and a transition plate 17 is further provided between the secondary conveyor belt assembly 16 and the belt conveying assembly 3. After the belt conveying assembly 3 receives and conveys the raw materials of the full-body fluid textured layout to a conveying plane of the secondary conveyor belt assembly 16, and then conveyed by the secondary conveyor belt assembly 16 to the pressing machine 14.

f, Pressing: The raw materials are pressed by the pressing machine 14 into a green body. In this example, the pressing machine 14 is a mold cavity-free pressing machine. The secondary conveyor belt assembly 16 directly conveys the raw materials of the full-body fluid textured layout 19 to a forming position of the pressing machine, the pressing machine 14 presses the raw materials of the full-body fluid textured layout 19 into a green body, the green body is sent to a drying kiln (not shown in the figures) under an action of the secondary conveyor belt assembly 16 and dried. The raw materials of a subsequent full-body fluid textured layout 19 enter a next round of green body formation under the action of the secondary conveyor belt assembly 16, thereby forming a cycle of distribution, pressing, and conveying continuously prepared green bodies to the drying kiln for drying.

g, Drying and sintering: The green body is dried and then sintered in a kiln.

h, Processing: After the sintering, the sintered green body is edged and polished or only edged to obtain a full-body fluid textured porcelain stoneware slab.

Figure 7:
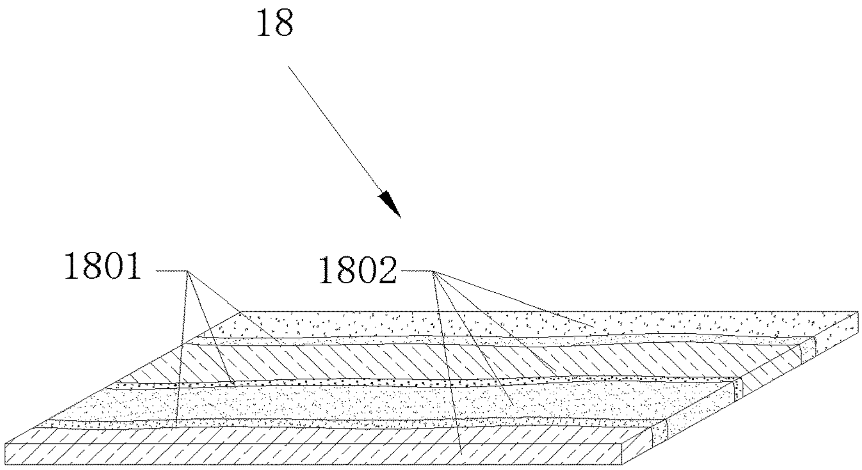
FIG. 7 is a schematic diagram illustrating a structure of a porcelain slab fabricated at an angle β of 60° in an embodiment of the present disclosure.

With the above manufacturing method, a porcelain slab shown in FIG. 7 is produced, where the porcelain slab includes a line zone and a texture zone.

Preferably, between the steps f and g, the green body is sent to a glazing procedure for ink jet of a predetermined pattern, application of a glaze, and surface decoration with a dry granular material to obtain a product with rich surface effects.

Example 3

In this example, another manufacturing method of a full-body textured porcelain stoneware slab is disclosed, which is different from the above example in that:

Refer to FIG. 8. In this example, an integrated-type discharge baffle 8 is adopted at an outlet of a feeding portion 5 and is driven by at least one drive member 9 to rise and fall. A plurality of partitions 10 are provided in each feeding hopper to divide the feeding hopper into a plurality of storage cavities and to divide a feeding portion 5 below the storage portion 4 into a plurality of feeding spaces corresponding to the plurality of storage cavities. By adjusting positions of the partitions 10 in the feeding hopper, a width of a raw material falling to the feeding conveyor belt 6 from feeding ports of the feeding spaces can be adjusted. In this example, 3 partitions are provided in each feeding hopper of the line powder feeding module 101, and the partitions divide the storage portion 4 evenly into 4 storage cavities (including 4011.1, 4011.2, 4011.3, 4011.4, 4012.1, 4012.2, 4012.3, and 4012.4) and to divide the feeding portion 5 into a plurality of feeding spaces corresponding to the storage cavities.

In the texture powder feeding module 102, the third feeding hopper 1021, the fifth feeding hopper 1023, and the seventh feeding hopper 1025 each are provided with 3 partitions 10 to divide a storage portion 4 evenly into 4 storage cavities (including 4013.1, 4013.2, 4013.3, 4013.4, 4015.1, 4015.2, 4015.3, 4015.4, 4017.1, 4017.2, 4017.3, and 4017.4) and to divide a feeding portion 5 into a plurality of feeding spaces corresponding to the storage cavities.

The fourth feeding hopper 1022, the sixth feeding hopper 1024, and the eighth feeding hopper 1026 each are provided with 2 partitions 10 to divide a storage portion 4 evenly into 3 storage cavities (including 4014.1, 4014.2, 4014.3, 4016.1, 4016.2, 4016.3, 4018.1, 4018.2, and 4018.3) and to divide a feeding portion 5 into a plurality of feeding spaces corresponding to the storage cavities.

The third feeding hopper 1021, the fourth feeding hopper 1022, the fifth feeding hopper 1023, the sixth feeding hopper 1024, the seventh feeding hopper 1025, and the eighth feeding hopper 1026 of the texture powder feeding module 102 are respectively filled with a powder in the first storage cavities from the right in the conveying direction of the feeding conveyor belt 6 (namely, 4013.1, 4014.1, 4015.1, 4016.1, 4017.1, and 4018.1). The first feeding hopper 1011 and the second feeding hopper 1012 of the line powder feeding module 101 are respectively filled with a powder in the first storage cavities from the left in the conveying direction of the feeding conveyor belt 6 (namely, 4011.1 and 4012.1). Arrows in FIG. 8 indicate the conveying directions of the feeding conveyor belts 6.

The remaining steps are the same as that in Example 2, and a porcelain slab shown in FIG. 7 is finally produced.

Example 4

Figure 9:
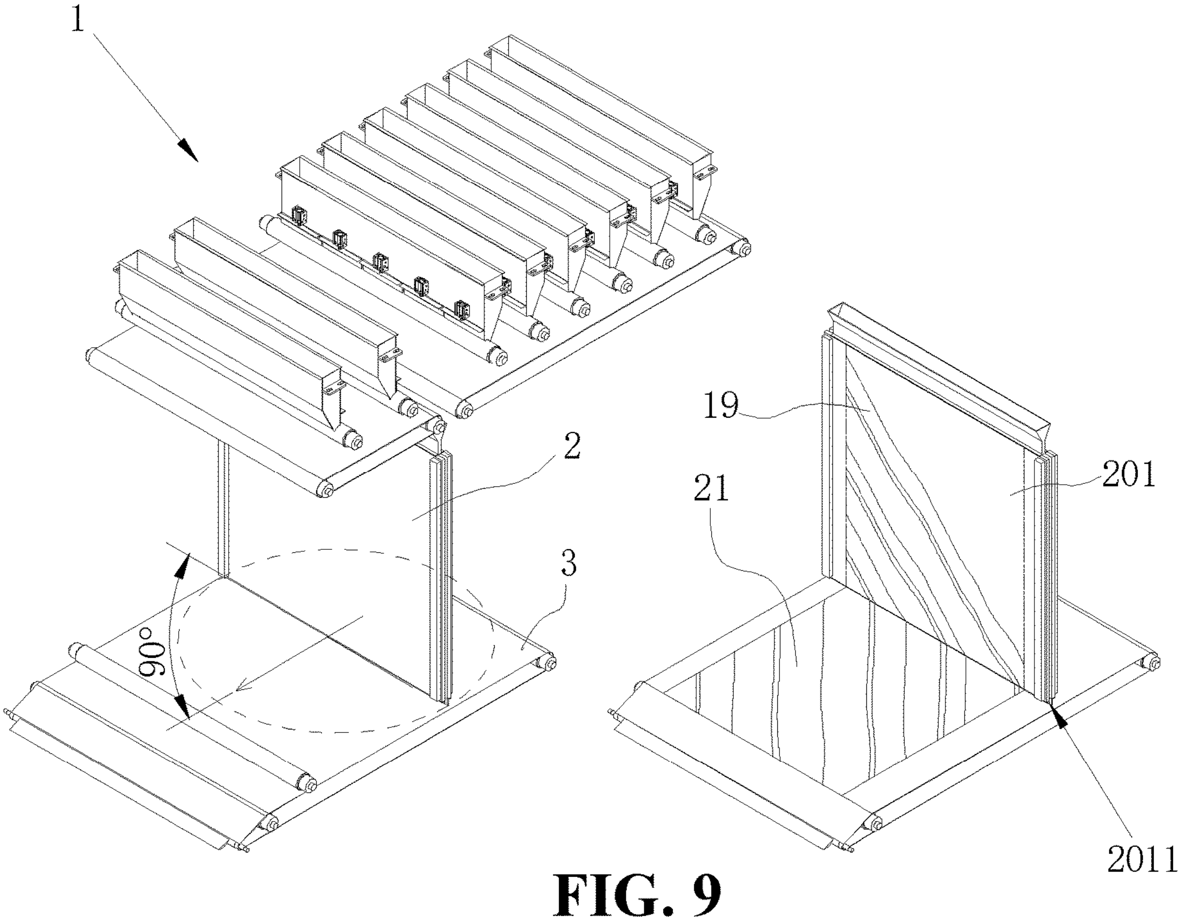
FIG. 9 shows a schematic structural diagram and a feeding state diagram of a distribution device with an angle β of 90° in an embodiment of the present disclosure.

In this example, another manufacturing method of a full-body textured porcelain stoneware slab is disclosed, which is different from the above example in that:

Refer to FIG. 9. The angle β is set to 90°, that is, an intersecting line of a lower end of the powder-preforming box 2 and the conveying plane of the belt conveying assembly 3 is perpendicular to a center line of the conveying plane of the belt conveying assembly 3.

Figure 10:
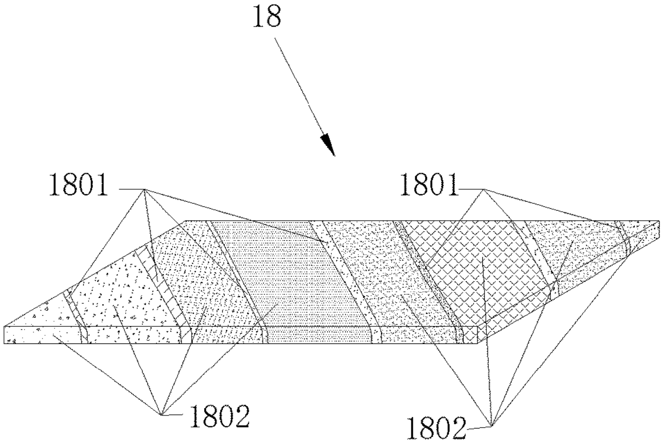
FIG. 10 is a schematic diagram illustrating a structure of a porcelain slab fabricated at an angle β of 90° in an embodiment of the present disclosure.

A powder with a slope-like full-body fluid textured layout 19 in the material-accommodating cavity 201 is flatly transferred to the conveying plane of the belt conveying assembly 3, thereby forming a powder layout of a diagonal fluid texture. In FIG. 9, the sign 21 indicates a raw material layout on the belt conveying assembly when the angle β is 90°. The remaining specific steps are the same as that in Example 2 or 3, and a porcelain slab shown in FIG. 10 can be continuously produced.

Example 5

Figure 11:
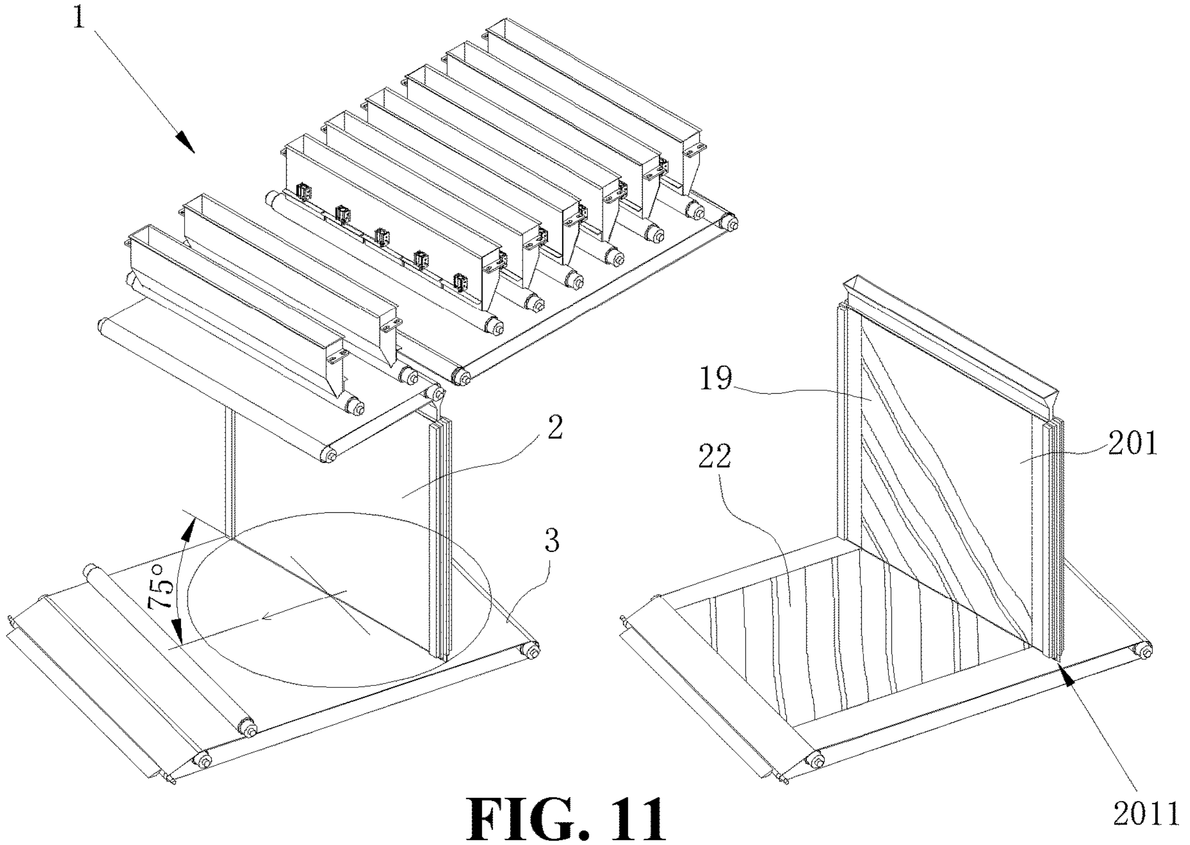
FIG. 11 shows a schematic structural diagram and a feeding state diagram of a distribution device with an angle β of 75° in an embodiment of the present disclosure.

In this example, another manufacturing method of a full-body textured porcelain stoneware slab is disclosed, which is different from the above example in that:

Refer to FIG. 11. The angle β is set to 75°.

Figure 12:
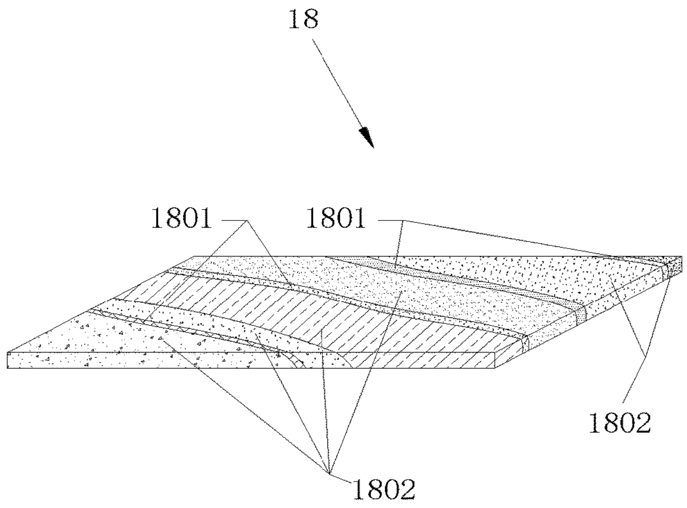
FIG. 12 is a schematic diagram illustrating a structure of a porcelain slab fabricated at an angle β of 75° in an embodiment of the present disclosure.

A raw material with a slope-like full-body fluid textured layout 19 in the material-accommodating cavity 20 is flatly transferred to the conveying plane of the belt conveying assembly 3, thereby forming a powder layout of a diagonal fluid texture. In FIG. 11, the sign 22 indicates a raw material layout on the belt conveying assembly when the angle β is 75°. The remaining specific steps are the same as that in Example 2, 3, or 4, and a porcelain slab shown in FIG. 12 can be continuously produced.

Example 6

Figure 13:
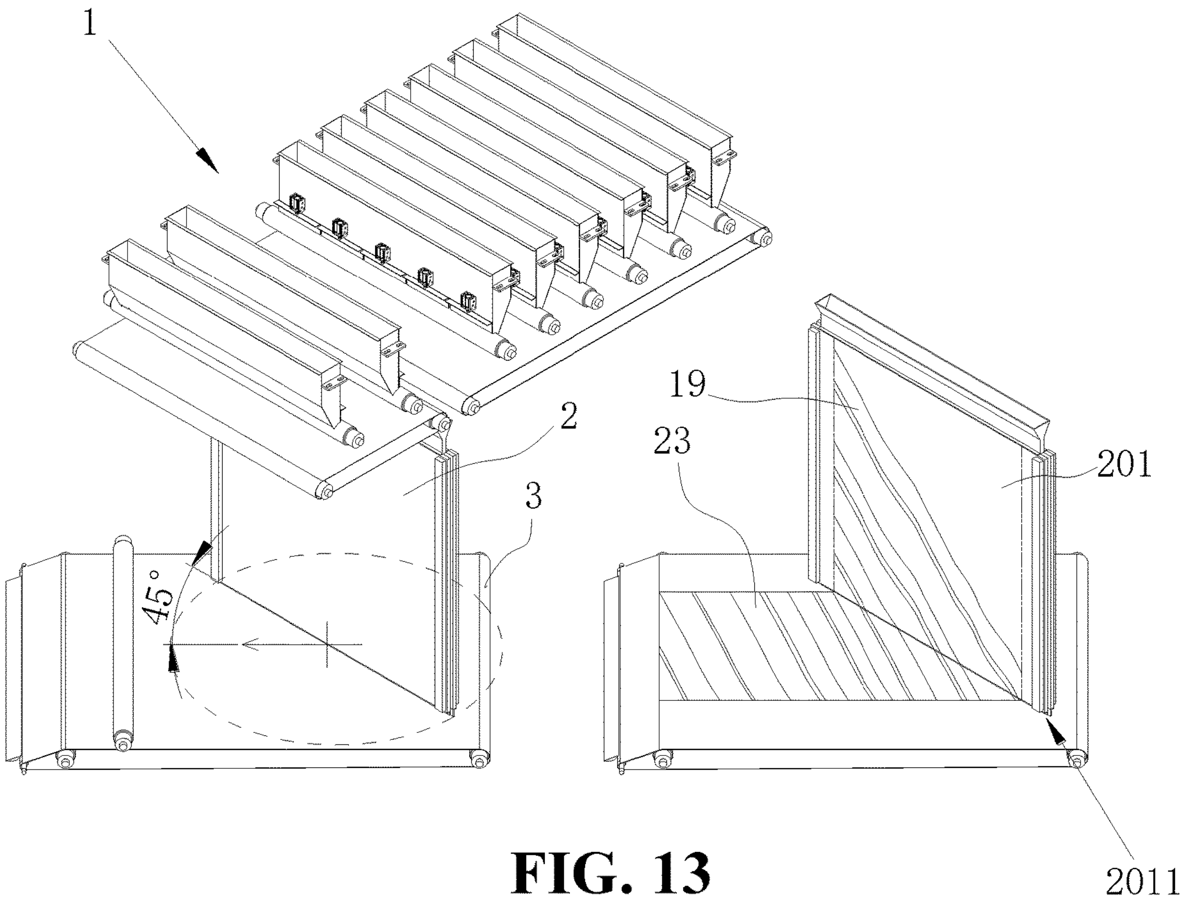
FIG. 13 shows a schematic structural diagram and a feeding state diagram of a distribution device with an angle β of 45° in an embodiment of the present disclosure.

In this example, another manufacturing method of a full-body textured porcelain stoneware slab is disclosed, which is different from the above example in that:

Refer to FIG. 13. The angle β is set to 45°.

Figure 14:
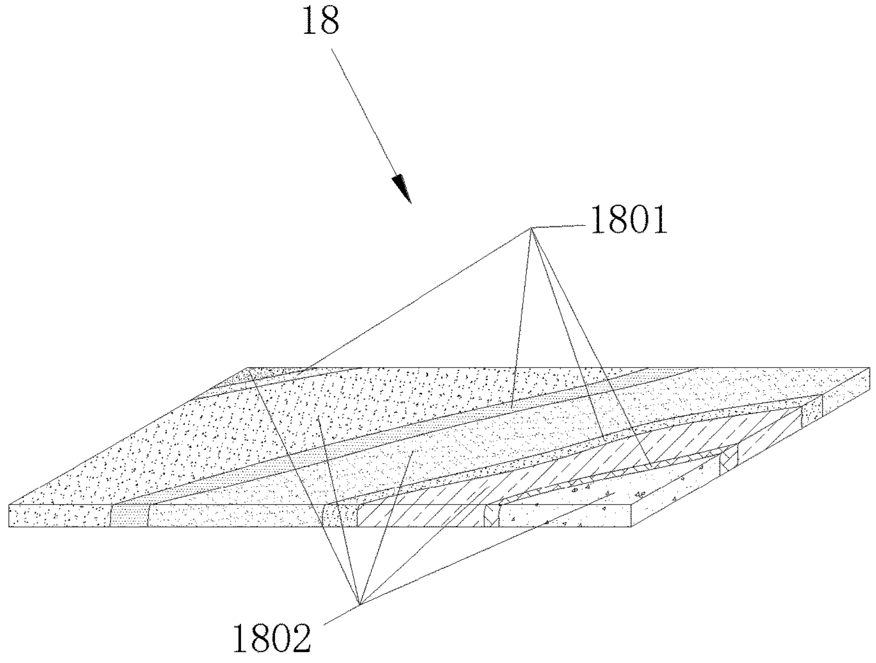
FIG. 14 is a schematic diagram illustrating a structure of a porcelain slab fabricated at an angle β of 45° in an embodiment of the present disclosure.

A raw material with a slope-like full-body fluid textured layout 19 in the material-accommodating cavity 201 is flatly transferred to the conveying plane of the belt conveying assembly 3, thereby forming a powder layout of a diagonal fluid texture. In FIG. 13, the sign 23 indicates a raw material layout on the belt conveying assembly when the angle is 45°. The remaining specific steps are the same as that in Example 2, 3, 4, or 5, and a porcelain slab shown in FIG. 14 can be continuously produced.

Example 7

Figure 17:
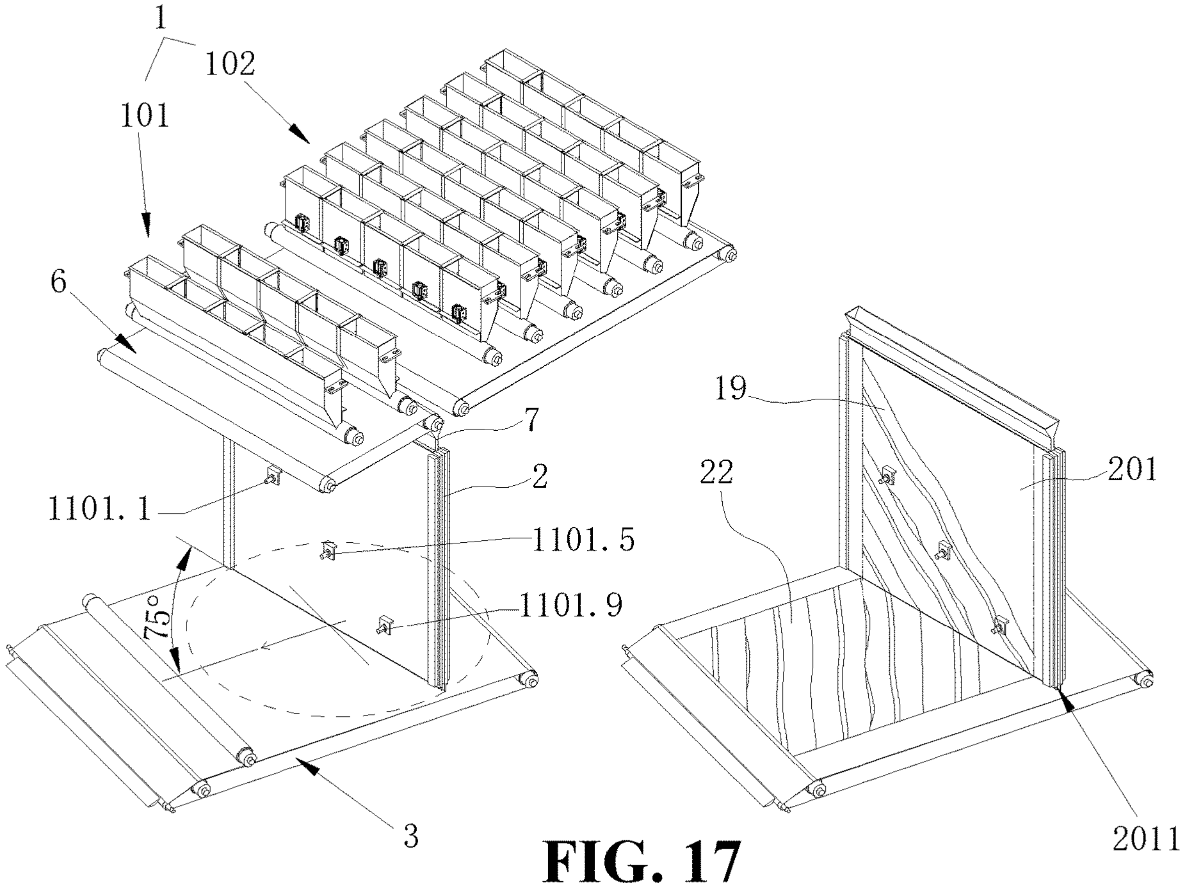
FIG. 17 is a schematic diagram illustrating a structure of a porcelain slab fabricated at an angle β of 75° in an embodiment of the present disclosure.

In this example, another manufacturing method of a full-body textured porcelain stoneware slab is disclosed, which is different from the above example in that:

Refer to FIG. 15 and FIG. 17. In this example, each feeding hopper of the line powder feeding module 101 and the texture powder feeding module 102 is provided with 4 partitions 10. The 4 partitions 10 divide each storage portion 4 evenly into 5 storage cavities, including: 4011.1, 4011.2, 4011.3, 4011.4, 4011.5, 4012.1, 4012.2, 4012.3, 4012.4, 4012.5, 4013.1, 4013.2, 4013.3, 4013.4, 4013.5, 4014.1, 4014.2, 4014.3, 4014.4, 4014.5, 4015.1, 4015.2, 4015.3, 4015.4, 4015.5, 4016.1, 4016.2, 4016.3, 4016.4, 4016.5, 4017.1, 4017.2, 4017.3, 4017.4, 4017.5, 4018.1, 4018.2, 4018.3, 4018.4, and 4018.5.

The 4 partitions 10 in each feeding hopper also divide a feeding portion 5 into a plurality of feeding spaces corresponding to the storage cavities. An outlet of each feeding space is provided with a discharge baffle 8, a drive member 9 is arranged corresponding to the discharge baffle 8 to drive the discharge baffle 8 to rise and fall, thereby controlling an open/close state and an opening size of an outlet of the feeding space.

One or more detection sensors 11 are arranged to correspondingly control one or more drive members 9 to operate. When a detection sensor 11 at a specified position detects a raw material, a corresponding drive member 9 is started to drive a corresponding discharge baffle 8 to close or open. In this example, 9 detection sensors are provided, including 1101.1, 1101.2, 1101.3, 1101.4, 1101.5, 1101.6, 1101.7, 1101.8, and 1101.9; the 9 detection sensors are arranged in a rectangular array, where the detection sensor 1101.1 correspondingly controls the falling of texture materials in storage cavities 4013.1, 4014.1, 4014.2, 4015.1, 4016.1, 4016.2, 4017.1, 4018.1, and 4018.2 to the feeding conveyor belt 6 below the storage cavities, and the detection sensor 1101.5 correspondingly controls storage cavities 4013.3, 4015.4, and 4017.5.

The angle β is set to 75°.

In step b, the storage cavities 4013.1 and 4013.3 each are filled with the dark-gray material, the storage cavities 4014.1 and 4014.2 each are filled with the mixture of the dark-gray and black materials, the storage cavities 4015.1 and 4015.4 each are filled with the light-gray material, the storage cavities 4016.1 and 4016.2 each are filled with the mixture of powdery, flaky, and granular materials obtained by inhomogeneously mixing and then pre-crushing the dark-gray, light-gray, and black materials, the storage cavities 4017.1 and 4017.5 each are filled with the mixture of the dark-gray and light-gray materials, the storage cavities 4018.1 and 4018.2 each are filled with the mixture of the light-gray and black materials, the storage cavity 4011.1 is filled with the white material, and the storage cavity 4012.1 is filled with the black material.

In step c, the operating frequencies and pause times of the feeding conveyor belt 6 below the line powder feeding module 101 and the feeding conveyor belt 6 below the texture powder feeding module 102 are set according to the predetermined design requirements. The distribution device is initiated, a roller motor of each feeding hopper of the texture powder feeding module 102 allows texture materials in storage cavities 4013.1, 4014.1, 4014.2, 4015.1, 4016.1, 4016.2, 4017.1, 4018.1, and 4018.2 correspondingly controlled by the detection sensor 1101.1 to fall onto the feeding conveyor belt 6 below the texture powder feeding module 102 according to preset running and pause times, and roller motors for storage cavities 4011.1 and 4012.1 of the line powder feeding module 101 allows line materials in the storage cavities 4011.1 and 4012.1 to fall onto the feeding conveyor belt 6 below the line powder feeding module 101 according to preset running and pause times, during which, due to the different preset running and pause times of the line powder feeding module 101 and the texture powder feeding module 102, the raw materials of different colors are not overlapped, partially overlapped, or semi-overlapped on the feeding conveyor belt.

The texture material on the feeding conveyor belt 6 below the texture powder feeding module 102 falls into the material-accommodating cavity 201 through the material-receiving hopper 7 at an opening of the upper end of the powder-preforming box 2, and the line material on the feeding conveyor belt 6 below the line powder feeding module 101 also falls into the material-accommodating cavity 201 through the material-receiving hopper 7 at the opening of the upper end of the powder-preforming box 2 during a predetermined pause interval of the feeding conveyor belt 6 below the texture powder feeding module 102. The raw materials accumulate in the material-accommodating cavity 201 with a corresponding feeding width until a set accumulation height is reached. When the detection sensor 1101.1 detects a material, corresponding feeding spaces of feeding hoppers are closed; and when the detection sensor 1101.5 detects a material, corresponding storage cavities 4013.3, 4015.4, and 4017.5 are opened for 0.2 s until the materials in the storage cavities 4013.3, 4015.4, and 4017.5 are fed onto the feeding conveyor belt. The raw materials in the material-accommodating cavity relies on their own weights to flow. When the detection sensor 1101.1 no longer detects a material, corresponding storage cavities are opened once again for feeding, thereby circularly forming a raw material layout in the material-accommodating cavity.

The raw materials on the feeding conveyor belt 6 fall onto the accumulated materials in the material-accommodating cavity 201 through the material-receiving hopper 7. As shown in FIG. 17, the raw materials accumulate and flow in the material-accommodating cavity 201 at an accumulation angle from top to bottom, and the raw materials fallen into the material-accommodating cavity 201 form a slope-like fluid textured layout 19 in the material-accommodating cavity under the control of corresponding detection sensors, and then are stored in the powder-preforming box 2.

Figure 18:
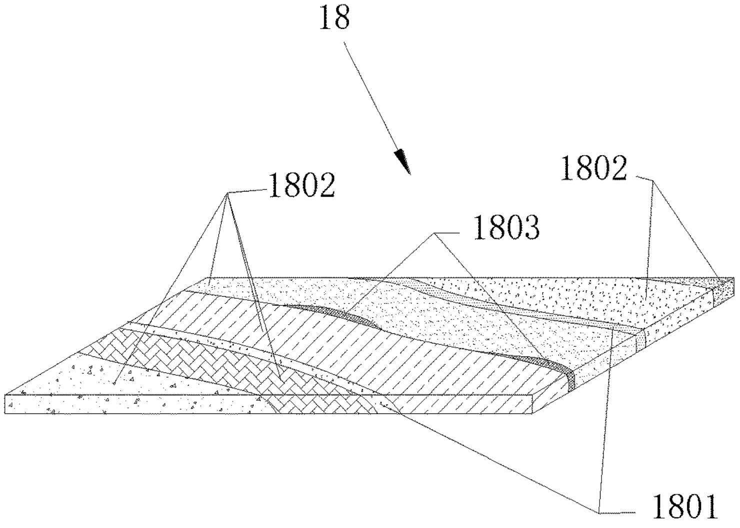
FIG. 18 is a schematic diagram illustrating a structure of a porcelain slab fabricated at an angle β of 75° in an embodiment of the present disclosure.

The remaining steps are consistent with that in any of Examples 2 to 6, and a porcelain slab shown in FIG. 18 is produced. The porcelain slab includes a line zone, a texture zone, and a line change zone 1803, and the line change zone 1803 is formed through the feeding of storage cavities controlled by the detection sensor 1101.5.

Example 8

Figure 19:
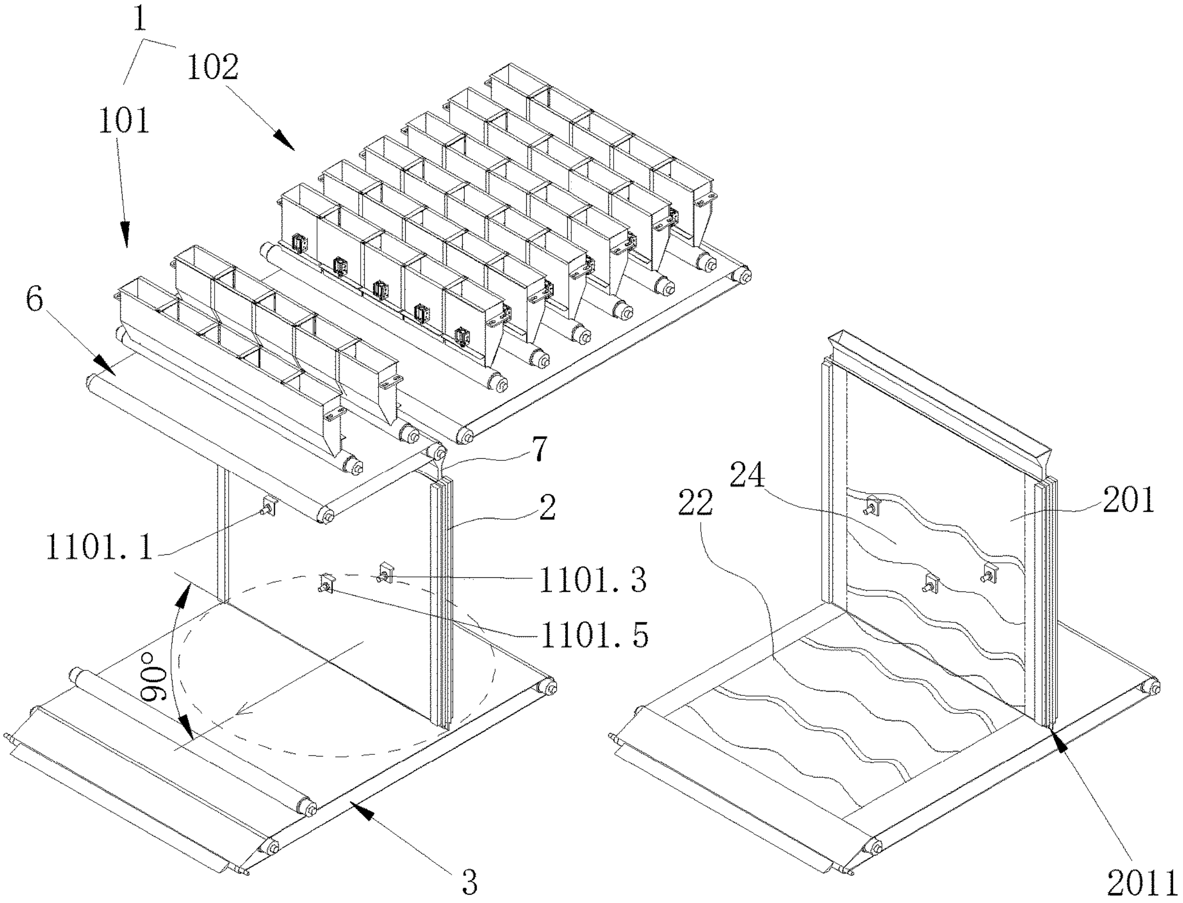
FIG. 19 is a schematic diagram illustrating a structure of a porcelain slab fabricated at an angle β of 90° in an embodiment of the present disclosure.

In this example, another manufacturing method of a full-body textured porcelain stoneware slab is disclosed, which is different from Example 7 in that:

Refer to FIG. 19. in the step b, the storage cavities 4013.1 and 4013.4 each are filled with the dark-gray material, the storage cavities 4014.2 and 4014.5 each are filled with the mixture of the dark-gray and black materials, the storage cavities 40155.3 and 4015.4 each are filled with the light-gray material, the storage cavities 4016.1 and 4016.2 each are filled with the mixture of powdery, flaky, and granular materials obtained by inhomogeneously mixing and then pre-crushing the dark-gray, light-gray, and black materials, the storage cavities 4017.4 and 4017.5 each are filled with the mixture of the dark-gray and light-gray materials, the storage cavities 4018.1, 4018.2, 4018.3, and 4018.4 each are filled with the mixture of the light-gray and black materials, the storage cavity 4011.1 is filled with the white material, and the storage cavity 4012.1 is filled with the black material.

The detection sensor 1101.1 correspondingly controls feeding spaces below storage cavities 4013.1, 4013.4, 4016.1, and 4016.2.

The detection sensor 1101.3 correspondingly controls feeding spaces below storage cavities 4014.2, 4014.5, 4017.4, and 4017.5.

The detection sensor 1101.5 correspondingly controls feeding spaces below storage cavities 4015.3, 4015.4, 4018.1, 4018.2, 4018.3, 4018.4, 4018.5, and 4018.6.

The angle β is set to 90°.

The texture material on the feeding conveyor belt 6 below the texture powder feeding module 102 falls into the material-accommodating cavity 201 through the material-receiving hopper 7 at an opening of the upper end of the powder-preforming box 2, and the line material on the feeding conveyor belt 6 below the line powder feeding module 101 also falls into the material-accommodating cavity 201 through the material-receiving hopper 7 during a predetermined pause interval of the feeding conveyor belt 6 below the texture powder feeding module 102. The raw materials accumulate in the material-accommodating cavity 201 with a corresponding feeding width until a set accumulation height is reached. When the detection sensor 1101.5 detects a material, feeding spaces under the corresponding storage cavities are closed; and when the detection sensors 1101.1 and 1101.3 do not detect a material, a material is further fed by corresponding storage cavities, then moves with the feeding conveyor belt 6 into the material-accommodating cavity 201 through the material-receiving hopper, and accumulates in the material-accommodating cavity 201 until the material can be detected by the detection sensors, and then the storage cavities are closed.

Refer to FIG. 19, the raw materials accumulate in the material-accommodating cavity at an accumulation angle from top to bottom to form a peak-like textured layout 24, and the raw materials of the peak-like textured layout are stored in the powder-preforming box 2.

Figure 20:
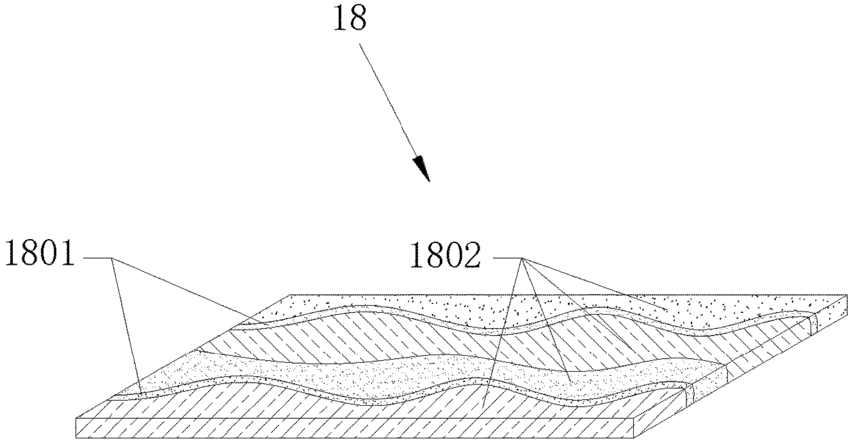
FIG. 20 is a schematic diagram illustrating a structure of a porcelain slab fabricated at an angle β of 90° in an embodiment of the present disclosure.

The remaining steps are consistent with that in Example 7, and a porcelain slab shown in FIG. 20 is produced.

Example 9

Figure 21:
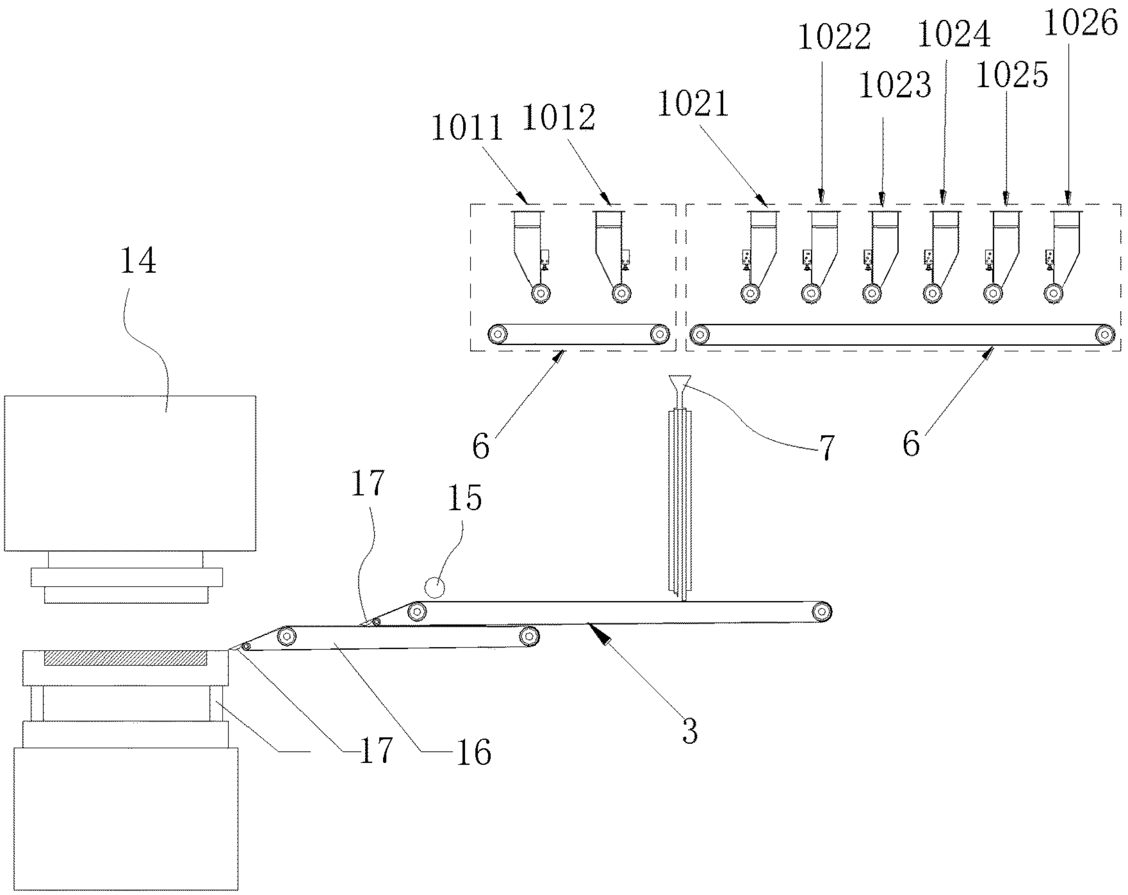
FIG. 21 is a schematic structural diagram of a ceramic production line in Example 9 of the present disclosure.

In this example, another manufacturing method of a full-body textured porcelain stoneware slab is disclosed, which is different from the above example in that:

Refer to FIG. 21. In this example, the pressing machine 14 is a stamping pressing machine with a mold cavity, and the secondary conveyor belt assembly 16 is a retractable movable conveyor belt in the prior art. A transition plate 17 is further provided at a discharge end of the secondary conveyor belt assembly 16. When the secondary conveyor belt assembly 16 moves forward to a mold cavity position of the pressing machine, the raw materials of the full-body fluid textured layout 19 or the raw materials of the peak-like textured layout 24 fall into the mold cavity of the pressing machine, and after the distribution, the secondary conveyor belt assembly 16 immediately retracts to a position below the belt conveying assembly 3 for the next round of material-receiving and distribution.

When the secondary conveyor belt assembly 16 leaves the mold cavity position of the pressing machine, the pressing machine starts stamping to form a green body, raw materials of a full-body fluid textured layout 19 received in the next round move forward with the secondary conveyor belt assembly 16, the green body previously pressed is pushed out of the pressing machine, and the next round of distribution is conducted, thereby forming a cycle of distribution, pressing, and conveying continuously prepared green bodies to the drying kiln for drying.

Example 10

Figure 22:
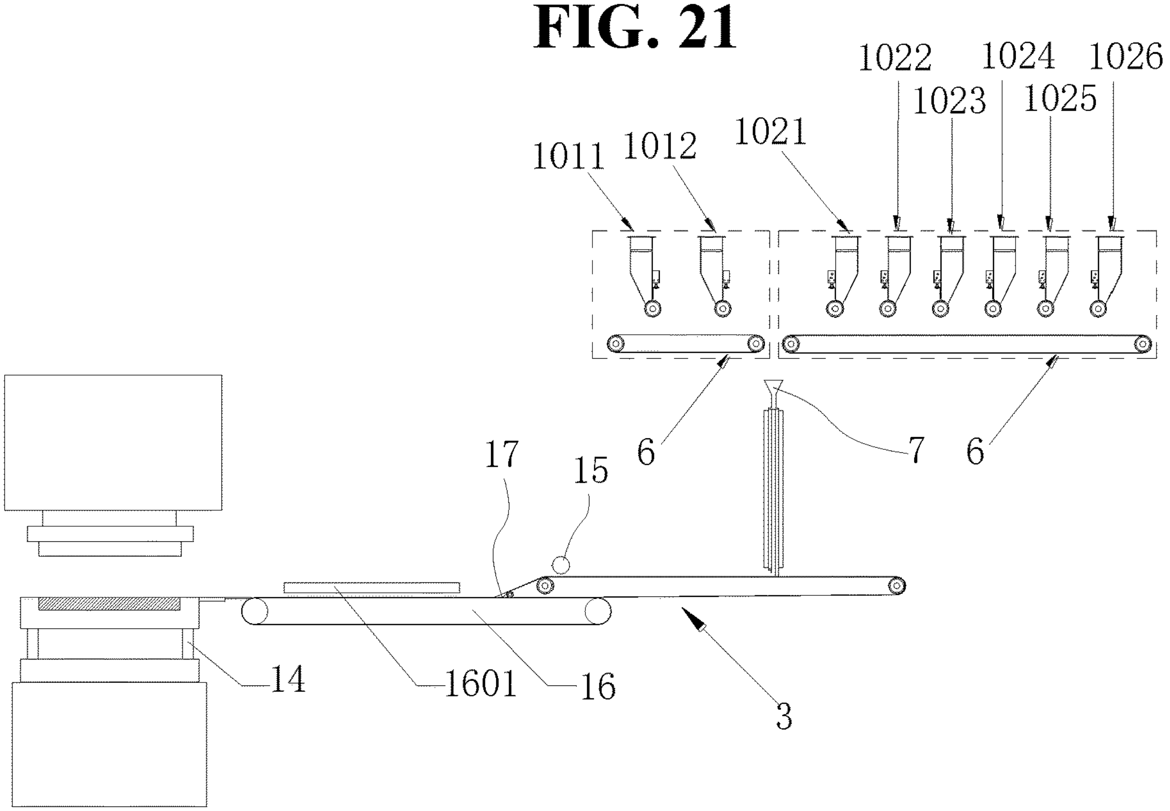
FIG. 22 is a schematic structural diagram of a ceramic production line in Example 10 of the present disclosure.

In this example, another manufacturing method of a full-body textured porcelain stoneware slab is disclosed, which is different from the above example in that:

Refer to FIG. 22. In this example, the pressing machine is a stamping pressing machine with a mold cavity, the secondary conveyor belt assembly 16 is further provided with a frame feeding grille 1601 which has an existing structure, such as a grille structure disclosed in Chinese Patent Application No. CN201010227330.6 or Chinese Patent Application No. CN200810088848.9.

In the pressing procedure, the frame feeding grille 1601 frames the raw materials on the conveying plane of the secondary conveyor belt assembly 16 and moves forward to a mold cavity position of the pressing machine, then the raw materials of the full-body fluid textured layout 19 or the raw materials of the peak-like textured layout 24 fall into the mold cavity of the pressing machine, and after completing the framing, the frame feeding grille 1601 immediately retracts to a position above the secondary conveyor belt assembly 16 for the next round of material-framing and distributing.

When the frame feeding grille 1601 leaves the mold cavity position of the pressing machine, the pressing machine starts stamping to form a green body, raw materials of a full-body fluid textured layout framed in the next round by the frame feeding grille 1601 move forward, the green body previously pressed is pushed out of the pressing machine, and the next round of distribution is conducted, thereby forming a cycle of distribution, pressing, and conveying continuously prepared green bodies to the drying kiln for drying.

Example 11

In this example, in the step b, the feeding hoppers of the feeding assembly 1 comprise pit carved roller feeding hoppers and flat roller feeding hoppers; or in step b, the raw materials on the feeding conveyor belt 6 are deflected by the deflector rod 12 to adjust a layout of the raw materials on the feeding conveyor belt 6, or the raw materials are disturbed when falling into the material-accommodating cavity 201, such that a layout of the raw materials in the material-accommodating cavity 201 changes; or in step c, in the material-accommodating cavity of the powder-preforming box 2, the barrier strip 2013 is adjusted to make a layout of the raw materials in the material-accommodating cavity 201 change; or in step b, positions of the partitions 10 in the feeding hopper and/or one or more discharge baffles of the split-type discharge baffles 8 are adjusted to adjust feeding widths, feeding positions, and feeding amounts of the feeding portions 5 of the feeding hoppers and thus make the raw materials enter the material-accommodating cavity 201 to form different accumulation surfaces, such that accumulation and flow patterns of the raw materials in the material-accommodating cavity 201 change.

Figure 23:
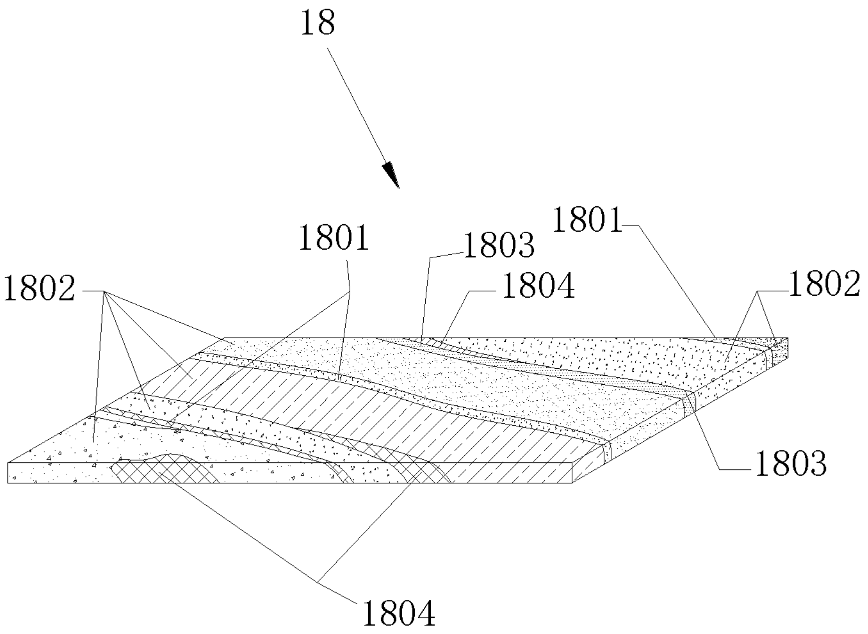
FIG. 23 is a schematic structural diagram of a porcelain slab fabricated in Example 11 of the present disclosure.

Thus, in continuous production, a full-body green body fluid textured porcelain slab that has basically consistent main bodies and slope-like texture changes shown in FIG. 23 of the present disclosure can be produced as required. In addition to a line zone 1801 and a texture zone 1802, the porcelain slab 18 includes a line change zone 1803 and a texture change zone 1804.

According to the disclosure and teaching of the above specification, those skilled in the art of the present disclosure may also change and modify the above embodiments. Therefore, the present disclosure is not limited to the specific embodiments disclosed and described above, and some modifications and changes made to the present disclosure should also fall within the protection scope of the claims of the present disclosure. In addition, although some specific terms are used in the specification, these terms are provided to merely illustrate rather than limit the present disclosure.

The invention claimed is:

1. A distribution device for a full-body textured porcelain stoneware slab, comprising a feeding assembly, a powder-preforming box, and a belt conveying assembly, wherein the belt conveying assembly is horizontally arranged below the powder-preforming box, and the feeding assembly is arranged above the powder-preforming box, the powder-preforming box is arranged at an included angle $\alpha$ with a conveying plane of the belt conveying assembly, and $61° \leq \alpha \leq 90°$, a material-accommodating cavity with opened upper and lower ends is formed in the powder-preforming box, and the opened lower end of the material-accommodating cavity is formed as a discharge gate;

an intersecting line of a lower end of the powder-preforming box and the conveying plane of the belt conveying assembly is at an included angle $\beta$ with a center line of the conveying plane of the belt conveying assembly, and $45° \leq \beta \leq 90°$; and the feeding assembly and the powder-preforming box are fixed to an angle adjustment apparatus, an intersecting point of the intersecting line of the lower end of the powder-preforming box and the conveying plane of the belt conveying assembly with the center line of the conveying plane of the belt conveying assembly is an adjustment center, and the angle adjustment apparatus drives the feeding assembly and the powder-preforming box to rotate around the adjustment center for adjustment.

2. The distribution device for a full-body textured porcelain stoneware slab according to claim 1, wherein the powder-preforming box comprises a front plate, a back plate, and a side plate connected to both the front plate and the back plate, the back plate and the front plate are arranged sequentially in a conveying direction of the belt conveying assembly, a spacing between a lower end of the front plate and a conveying surface of the belt conveying assembly is greater than a spacing between a lower end of the back plate and the conveying surface of the belt conveying assembly; and the front plate is further provided with a gate plate which is height adjustable in a vertical direction.

3. The distribution device for a full-body textured porcelain stoneware slab according to claim 2, wherein the feeding assembly comprises a plurality of feeding hoppers and a feeding conveyor belt arranged below the plurality of feeding hoppers, each of the plurality of feeding hoppers comprises a storage portion and a feeding portion and is a roller feeding hopper or an electronically-controlled feeding hopper comprising dot-matrix feeding pores each having a pore size of 3 mm to 20 mm, and a discharge end of the feeding conveyor belt is located directly above the material-accommodating cavity, and an upper end of the material-accommodating cavity is connected to a material-receiving hopper.

4. The distribution device for a full-body textured porcelain stoneware slab according to claim 3, wherein 2 to 10 feeding hoppers are provided in parallel in a conveying direction of the feeding conveyor belt, the feeding hoppers are roller feeding hoppers, a discharge baffle is provided at an outlet of a feeding portion of each of the feeding hoppers, and each of the feeding hoppers is provided with a drive member configured to drive the discharge baffle to rise and fall vertically to adjust a size of the outlet of the feeding portion.

5. The distribution device for a full-body textured porcelain stoneware slab according to claim 4, wherein the discharge baffle is formed as an integrated-type discharge baffle, the drive member drives the integrated-type discharge baffle to rise and fall vertically, a plurality of partitions are provided in each of the feeding hoppers, and the plurality of partitions divide the storage portion into a plurality of storage cavities and further divide the feeding portion into a plurality of feeding spaces corresponding to the plurality of storage cavities;

the plurality of partitions are arranged at intervals in a direction perpendicular to the conveying direction of the feeding conveyor belt, and positions of the plurality of partitions in the arrangement direction are adjustable;

or the discharge baffle is formed as a split-type discharge baffle, the split-type discharge baffle is provided at outlets of the feeding spaces below the storage cavities, and the split-type discharge baffle is provided with drive members correspondingly; and the feeding hoppers of the feeding assembly are selected from the group consisting of a flat roller feeding hopper, a rack roller feeding hopper, a heteromorphic pit carved roller feeding hopper, and any combination of two or more thereof.

6. The distribution device for a full-body textured porcelain stoneware slab according to claim 5, wherein the front plate and the back plate are transparent plates, the front plate or the back plate is provided with one or more detection sensors, and the one or more detection sensors correspondingly control a start/stop state of one or more drive members;

the one or more detection sensors are proximity switches or photoelectric sensors;

the feeding conveyor belt is provided with a deflector rod which is adjustable in angle and retractable; and an adjustable barrier strip is provided in the material-accommodating cavity.

* * * * *